US008291001B2

(12) United States Patent
Burke et al.

(10) Patent No.: US 8,291,001 B2
(45) Date of Patent: Oct. 16, 2012

(54) SIGNAL PROCESSING FOR MEDIA TYPE IDENTIFICATION

(75) Inventors: Greg M. Burke, San Diego, CA (US); Yang Shi, San Diego, CA (US)

(73) Assignee: Eastman Kodak Company, Rochester, NY (US)

( * ) Notice: Subject to any disclaimer, the term of this patent is extended or adjusted under 35 U.S.C. 154(b) by 1253 days.

(21) Appl. No.: 12/037,970

(22) Filed: Feb. 27, 2008

(65) Prior Publication Data

US 2009/0213166 A1 Aug. 27, 2009

(51) Int. Cl.
*G06F 7/00* (2006.01)
*G06F 15/00* (2006.01)
*B41J 2/01* (2006.01)
*B41J 29/393* (2006.01)

(52) U.S. Cl. ........................... 708/200; 347/105; 347/19

(58) Field of Classification Search .................. 708/200; 347/105, 19
See application file for complete search history.

(56) References Cited

U.S. PATENT DOCUMENTS 5,170,047 A 12/1992 Beauchamp et al.
5,905,512 A 5/1999 Beauchamp
5,966,205 A * 10/1999 Jung et al. ........................ 356/71
5,974,160 A * 10/1999 Shiratori et al. .............. 382/112
5,975,674 A 11/1999 Beauchamp et al.
6,036,298 A 3/2000 Walker
6,058,201 A * 5/2000 Sikes et al. .................... 382/112
6,122,042 A * 9/2000 Wunderman et al. ........... 356/73
6,172,690 B1 1/2001 Angulo et al.
6,291,829 B1 9/2001 Allen et al.
6,322,192 B1 11/2001 Walker
6,335,501 B1 * 1/2002 Khalfan ........................ 209/582
6,386,669 B1 * 5/2002 Scofield et al. ................. 347/14
6,400,099 B1 6/2002 Walker
6,623,096 B1 9/2003 Castano et al.
6,764,158 B2 7/2004 Arquilevich et al.
6,905,187 B2 6/2005 Arquilevich et al.
6,914,684 B1 7/2005 Bolash et al.
7,728,992 B2 * 6/2010 Yamamoto et al. .......... 358/1.13
2005/0100204 A1 * 5/2005 Afzal et al. ................... 382/135
2006/0103691 A1 5/2006 Dietl et al.

* cited by examiner

*Primary Examiner* — Chat Do
*Assistant Examiner* — Kevin G Hughes
(74) *Attorney, Agent, or Firm* — Kevin E. Spaulding

(57) ABSTRACT

A method for identifying a type of recording medium using a time-varying output signal from a photosensor includes amplifying the time-varying output signal of the photosensor; converting the amplified time-varying output signal of the photosensor to digitized data points using an analog to digital converter thereby creating a first set of digitized data; filtering the first set of digitized data to provide a low pass data set; filtering the first set of digitized data to provide a high pass data set; computing the standard deviation of the low pass data set; computing the standard deviation of the high pass data set; and identifying the recording medium type using values from both the standard deviation of the low pass data set and the standard deviation of the high pass data set.

11 Claims, 22 Drawing Sheets

SIGNAL PROCESSING FOR MEDIA TYPE IDENTIFICATION

CROSS REFERENCE TO RELATED APPLICATIONS

Reference is made to commonly-assigned, U.S. patent application Ser. No. 12/037,966, now U.S. Pat. No. 7,800,089 issued Sep. 21, 2010, entitled "OPTICAL SENSOR FOR A PRINTER" and U.S. Patent Publication No. 2009/0213158 published Aug. 27, 2009, entitled SIGNAL PROCESSING FOR RECORDING MEDIUM INDICIA both filed concurrently herewith.

FIELD OF THE INVENTION

This invention relates generally to the field of printers, and in particular to an optical sensor assembly configured to obtain information regarding a recording medium and methods of processing the information.

BACKGROUND OF THE INVENTION

In a carriage printer, such as an inkjet carriage printer, a printhead is mounted in a carriage that is moved back and forth across the region of printing. To print an image on a sheet of paper or other recording medium (sometimes generically referred to as paper herein), the recording medium is advanced a given distance along a recording medium advance direction and then stopped. While the recording medium is stopped and supported on a platen, the printhead carriage is moved in a direction that is substantially perpendicular to the recording medium advance direction as marks are controllably made by marking elements on the recording medium—for example by ejecting drops from an inkjet printhead. After the carriage has printed a swath of the image while traversing the recording medium, the recording medium is advanced, the carriage direction of motion is reversed, and the image is formed swath by swath.

In order to produce high quality images, it is helpful to provide information to the printer controller electronics regarding the printing side of the recording medium and the characteristics of the marks printed on the recording medium by the printhead. Information about the recording medium itself can include whether it is a glossy or matte-finish paper. Information about the marks printed on the recording medium can include relative alignment between marks of different colors, angular misorientation of the printhead relative to the direction of relative motion of the recording medium, or relative alignment of marks between left to right and right to left passes in a carriage printer, or missing marks corresponding to defective portions of the printhead, such as bad nozzles in an inkjet printhead. Using the information from the optical sensor, the printer controller is designed to control the printing process to optimize printing quality by using appropriate print modes for the detected media type, by correcting for various types of misalignments and by compensating for defective portions of the printhead.

It is known in the prior art to attach an optical sensor assembly to the printhead carriage of a carriage printer. See for example U.S. Pat. No. 5,170,047, U.S. Pat. No. 5,905,512, U.S. Pat. No. 5,975,674, U.S. Pat. No. 6,036,298, U.S. Pat. No. 6,172,690, U.S. Pat. No. 6,322,192, U.S. Pat. No. 6,400,099, U.S. Pat. No. 6,623,096, U.S. Pat. No. 6,764,158 and U.S. Pat. No. 6,905,187. Such an optical sensor assembly can be called a carriage sensor. In the same way that the printhead can mark on all regions of the paper by the back and forth motion of the carriage and by the advancing of the recording medium between passes of the carriage, the carriage sensor is able to provide optical measurements, typically of optical reflectance, for all regions of the paper. A carriage sensor assembly typically includes one or more photosensors and one or more light sources, such as LED's, mounted such that the emitted light is reflected off the printing side of the recording medium, and the reflected light is received in the one or more photosensors. Typically an external lens is configured to increase the amount of reflected light that is received by the photosensor. Typically the photosensor signal is amplified and processed to separate the signal from the background noise. LED's and photosensors can be oriented relative to each other such that the photosensor receives specular reflections of light emitted from an LED (i.e. light reflected from the recording medium at the same angle as the incident angle relative to the normal to the nominal plane of the recording medium) or diffuse reflections of light emitted from an LED (i.e. light reflected from the recording medium at a different angle than the angle of incidence). Diffuse light scattering can be due to local roughness in the recording medium or to localized curvature in the medium for example.

Competitive pressures drive the need to provide high quality printing at lower cost. High quality printing can require smaller dot sizes that the printhead marks on the paper. Typical drop size of modern inkjet printers, for example, is on the order of several picoliters or smaller. Because of this, test patterns for alignment or defective jets can provide a weak signal, and yet these tests must be accurate or the printer controller will not make optimized corrections. Lower cost in the printer can require removing cost from the carriage sensor optics and/or electronics. This can make it even more difficult to accurately sense marks on paper or the characteristics of the printing surface of the recording medium. What is needed is a low-cost design for the carriage sensor and its associated electronics that is consistent with the requirements of high quality printing.

SUMMARY OF THE INVENTION

According to an aspect of the invention, a method for identifying a type of recording medium using a time-varying output signal from a photosensor includes amplifying the time-varying output signal of the photosensor; converting the amplified time-varying output signal of the photosensor to digitized data points using an analog to digital converter thereby creating a first set of digitized data; filtering the first set of digitized data to provide a low pass data set; filtering the first set of digitized data to provide a high pass data set; computing the standard deviation of the low pass data set; computing the standard deviation of the high pass data set; and identifying the recording medium type using values from both the standard deviation of the low pass data set and the standard deviation of the high pass data set.

BRIEF DESCRIPTION OF THE DRAWINGS

In the detailed description of the preferred embodiments of the invention presented below, reference is made to the accompanying drawings, in which.

DETAILED DESCRIPTION OF THE INVENTION

The present description will be directed in particular to elements forming part of, or cooperating more directly with, apparatus in accordance with the present invention. It is to be understood that elements not specifically shown or described may take various forms well known to those skilled in the art.

Figure 1:
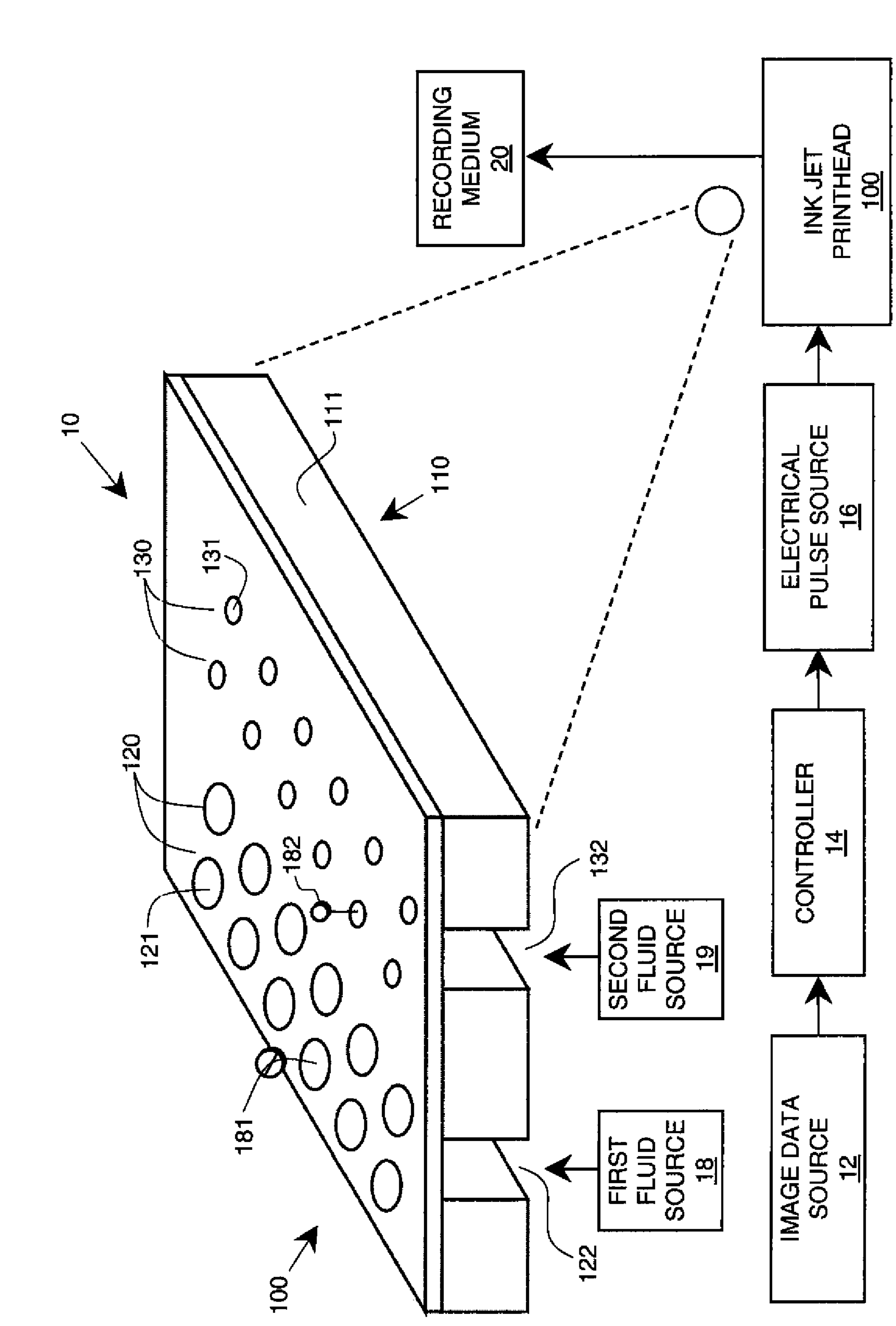
FIG. 1 is a schematic representation of an inkjet printer system.

Referring to FIG. 1, a schematic representation of an inkjet printer system 10 is shown, as described in US 2006/0103691 A1. The system includes a source 12 of image data which provides signals that are interpreted by a controller 14 as being commands to eject drops. Controller 14 outputs signals to a source 16 of electrical energy pulses that are inputted to the inkjet printhead 100 which includes at least one printhead die 110. In the example shown in FIG. 1, there are two nozzle arrays. Nozzles 121 in the first nozzle array 120 have a larger opening area than nozzles 131 in the second nozzle array 130. In this example, each of the two nozzle arrays has two staggered rows of nozzles, each row having a nozzle density of 600 per inch. The effective nozzle density then in each array is 1200 per inch. If pixels on the recording medium were sequentially numbered along the paper advance direction, the nozzles from one row of an array would print the odd numbered pixels, while the nozzles from the other row of the array would print the even numbered pixels. In fluid communication with each nozzle array is a corresponding ink delivery pathway. Ink delivery pathway 122 is in fluid communication with nozzle array 120, and ink delivery pathway 132 is in fluid communication with nozzle array 130. Portions of fluid delivery pathways 122 and 132 are shown in FIG. 1 as openings through printhead die substrate 111. One or more printhead die 110 will be included in inkjet printhead 100, but only one printhead die 110 is shown in FIG. 1. The printhead die are arranged on a support member as discussed below relative to FIG. 2. In FIG. 1, first ink source 18 supplies ink to first nozzle array 120 via ink delivery pathway 122, and second ink source 19 supplies ink to second nozzle array 130 via ink delivery pathway 132. Although distinct ink sources 18 and 19 are shown, in some applications it can be beneficial to have a single ink source supplying ink to nozzle arrays 120 and 130 via ink delivery pathways 122 and 132 respectively. Also, in some embodiments, fewer than two or more than two nozzle arrays can be included on printhead die 110. In some embodiments, all nozzles on a printhead die 110 can be the same size, rather than having multiple sized nozzles on a printhead die.

Not shown in FIG. 1 are the drop forming mechanisms associated with the nozzles. Drop forming mechanisms can be of a variety of types, some of which include a heating element to vaporize a portion of ink and thereby cause ejection of a droplet, or a piezoelectric transducer to constrict the volume of a fluid chamber and thereby cause ejection, or an actuator which is made to move (for example, by heating a bilayer element) and thereby cause ejection. In any case, electrical pulses from pulse source 16 are sent to the various drop ejectors according to the desired deposition pattern. In the example of FIG. 1, droplets 181 ejected from nozzle array 120 are larger than droplets 182 ejected from nozzle array 130, due to the larger nozzle opening area. Typically other aspects of the drop forming mechanisms (not shown) associated respectively with nozzle arrays 120 and 130 are also sized differently in order to optimize the drop ejection process for the different sized drops. During operation, droplets of ink are deposited on a recording medium 20.

Figure 2:
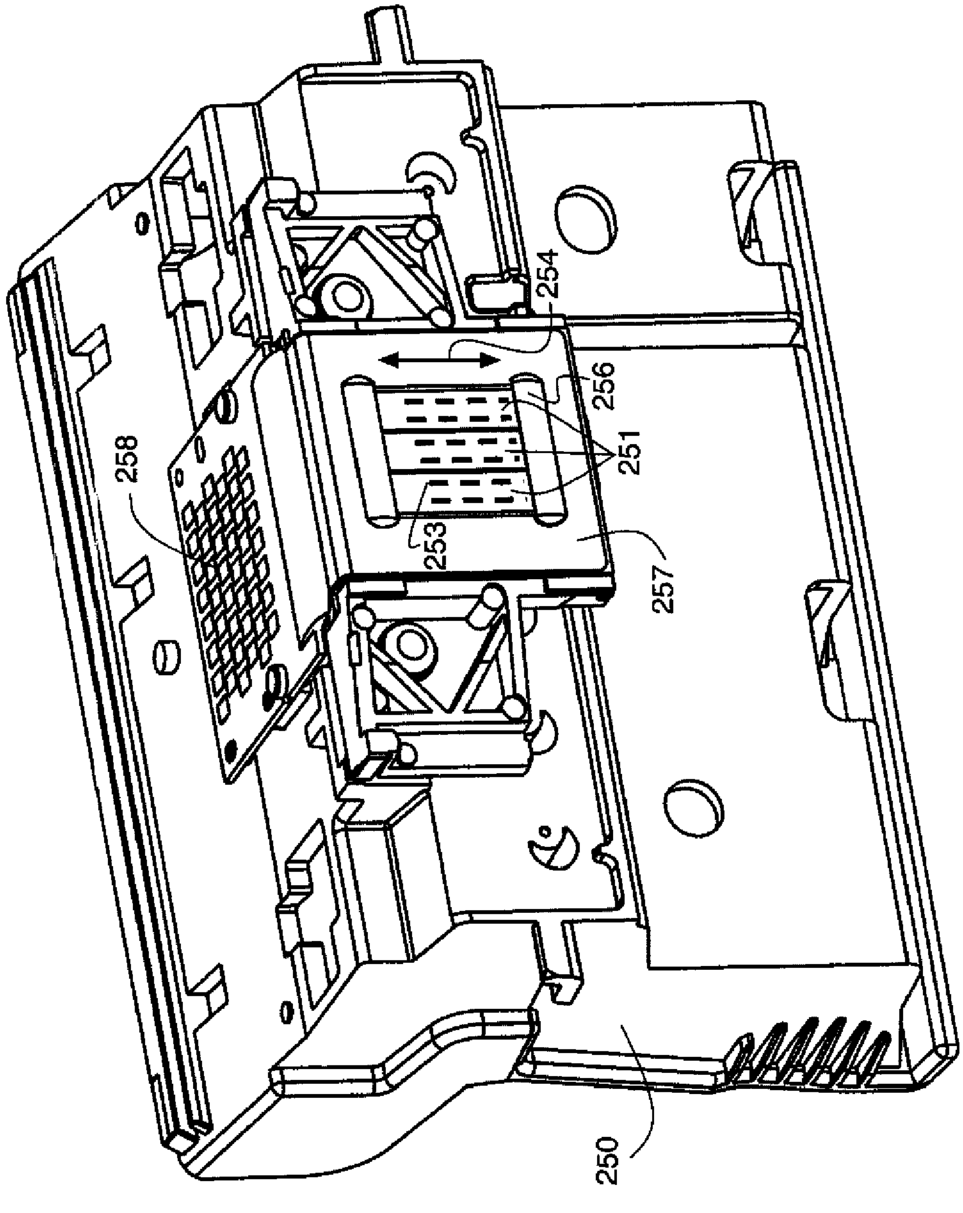
FIG. 2 is a perspective view of a portion of a printhead chassis.

FIG. 2 shows a perspective view of a portion of a printhead chassis 250, which is an example of an inkjet printhead 100. Printhead chassis 250 includes three printhead die 251 (similar to printhead die 110), each printhead die containing two nozzle arrays 253, so that printhead chassis 250 contains six nozzle arrays 253 altogether. The six nozzle arrays 253 in this example can be each connected to separate ink sources (not shown in FIG. 2), such as cyan, magenta, yellow, text black, photo black, and a colorless protective printing fluid. Each of the six nozzle arrays 253 is disposed along direction 254, and the length of each nozzle array along direction 254 is typically on the order of 1 inch or less. Typical lengths of recording media are 6 inches for photographic prints (4 inches by 6 inches), or 11 inches for 8.5 by 11 inch paper. Thus, in order to print the full image, a number of swaths are successively printed while moving printhead chassis 250 across the recording medium. Following the printing of a swath, the recording medium is advanced.

Also shown in FIG. 2 is a flex circuit 257 to which the printhead die 251 are electrically interconnected, for example by wire bonding or TAB bonding. The interconnections are covered by an encapsulant 256 to protect them. Flex circuit 257 bends around the side of printhead chassis 250 and connects to connector board 258. When printhead chassis 250 is mounted into the carriage 200 (see FIG. 3), connector board 258 is electrically connected to a connector (not shown) on the carriage 200, so that electrical signals can be transmitted to the printhead die 251.

Figure 3:
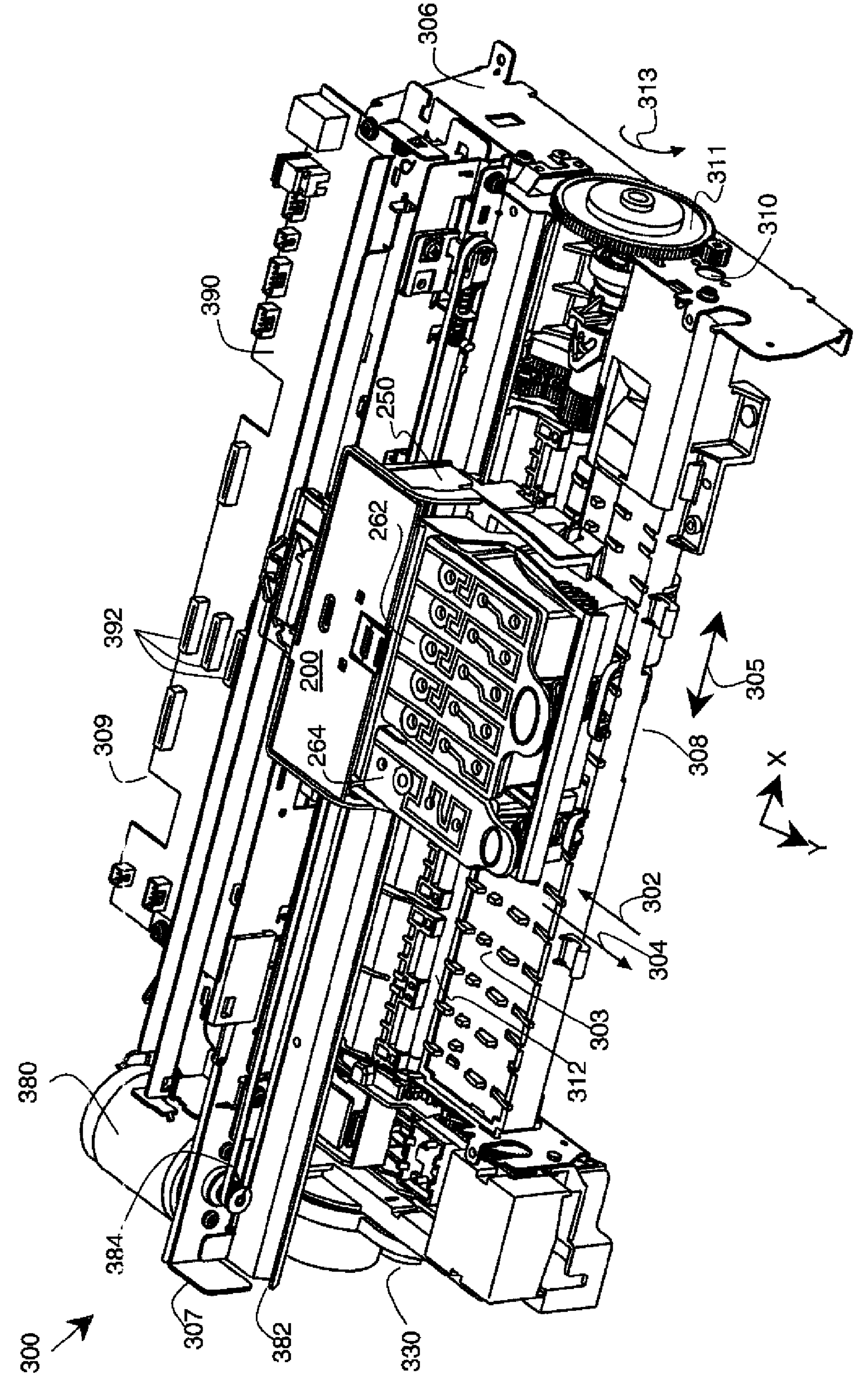
FIG. 3 is a perspective view of a portion of a carriage printer.

FIG. 3 shows a portion of a carriage printer. Some of the parts of the printer have been hidden in the view shown in FIG. 3 so that other parts can be more clearly seen. Printer chassis 300 has a print region 303 (also referred to as a platen) across which carriage 200 is moved back and forth 305 along the X axis between the right side 306 and the left side 307 of printer chassis 300 while printing on recording medium that is supported by the platen 303. Carriage motor 380 moves belt 384 to move carriage 200 back and forth along carriage guide rail 382. Printhead chassis 250 is mounted in carriage 200, and ink supplies 262 and 264 are mounted in the printhead chassis 250. The mounting orientation of printhead chassis 250 is rotated relative to the view in FIG. 2, so that the printhead die 251 are located at the bottom side of printhead chassis 250, the droplets of ink being ejected downward onto the recording media in print region 303 in the view of FIG. 3. Ink supply 262, in this example, contains five ink sources cyan, magenta, yellow, photo black, and colorless protective fluid, while ink supply 264 contains the ink source for text black. Paper, or other recording media (sometimes generically referred to as paper herein) is loaded along paper load entry direction 302 toward the front 308 of printer chassis 300. A variety of rollers are used to advance the medium through the printer, as shown schematically in the side view of FIG. 4. In this example, a pickup roller 320 moves the top sheet 371 of a stack 370 of paper or other recording media in the direction of arrow 302. A turn roller 322 toward the rear 309 of the printer chassis 300 acts to move the paper around a C-shaped path (in cooperation with a curved rear wall surface) so that the paper continues to advance along direction arrow 304 from the rear 309 of the printer. The paper is then moved by feed roller 312 and idler roller(s) 323 to advance along the Y axis across print region 303, and from there to a discharge roller 324 and star wheel(s) 325 so that printed paper exits along direction 304. Feed roller 312 includes a feed roller shaft 319 along its axis, and feed roller gear 311 is mounted on the feed roller shaft 319. Feed roller 312 can include of a separate roller mounted on feed roller shaft 319, or a thin high friction coating on feed roller shaft 319. The motor that powers the paper advance rollers is not shown in FIG. 1, but the hole 310 at the right side 306 of the printer chassis 300 is where the motor gear (not shown) protrudes through in order to engage feed roller gear 311, as well as the gear for the discharge roller (not shown). For normal paper pick-up and feeding, it is desired that all rollers rotate in forward direction 313. Toward the left side 307 in the example of FIG. 3 is the maintenance station 330. Toward the rear 309 of the printer in this example is located the electronics board 390, which contains cable connectors 392 for communicating via cables (not shown) to the printhead carriage 200 and from there to the printhead. Also on the electronics board are typically mounted motor controllers for the carriage motor 380 and for the paper advance motor, a processor and/or other control electronics for controlling the printing process, and an optional connector for a cable to a host computer.

Figure 4:
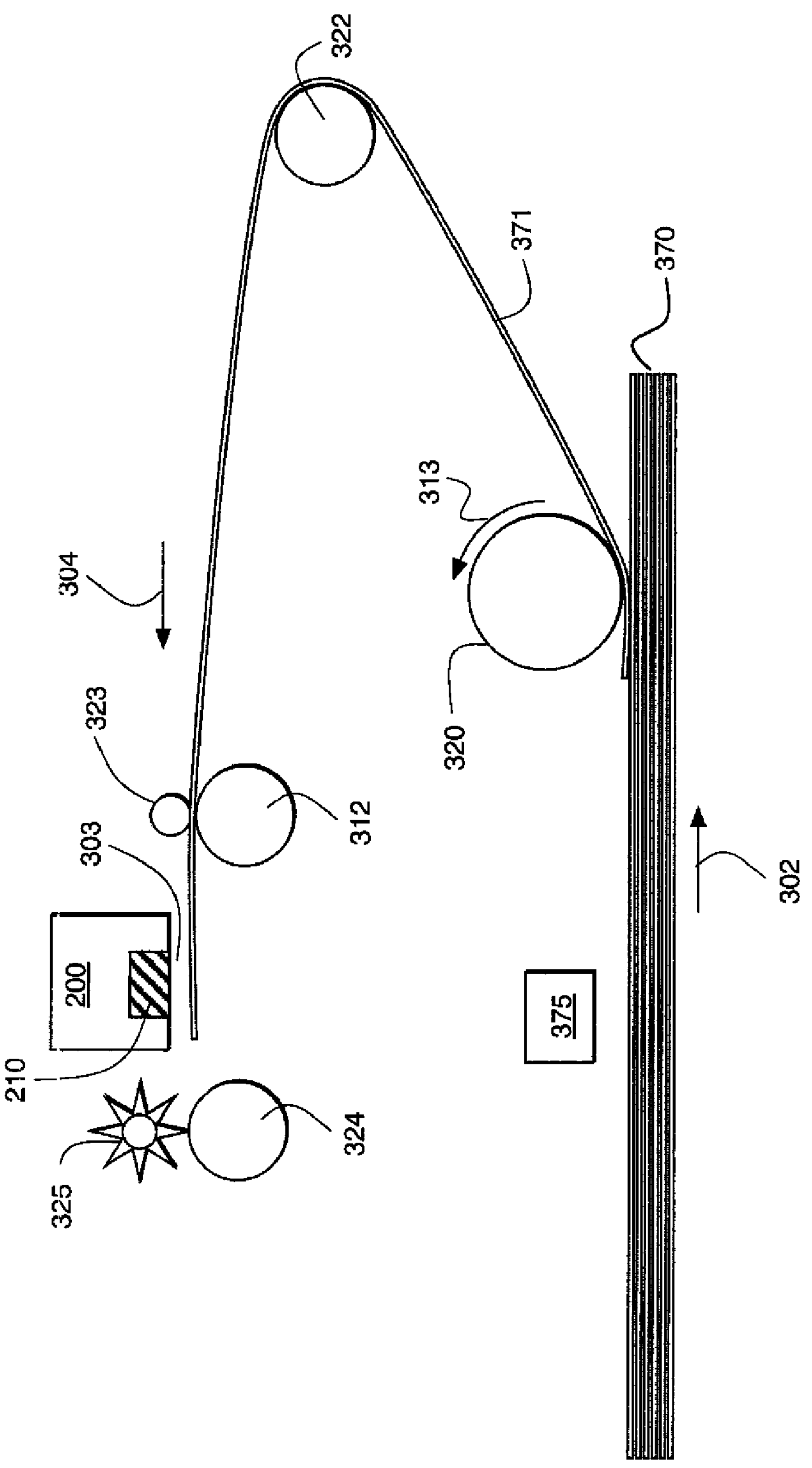
FIG. 4 is a schematic side view of a paper path in a carriage printer.

Also shown in FIG. 4 is backside media sensor 375, which is used to detect media identification markings on the backside of the top sheet of media 371 prior to printing. The backside of the media is defined as the side of the sheet that is not intended for printing. Specialty media having glossy, luster, or matte finishes (for example) for different quality media can be marked on the backside by the media manufacturer to identify the media type. While the backside media sensor 375 is shown in FIG. 4 as being located upstream of pickup roller 320, other locations are possible. Typically the backside media sensor 375 consists of a light source (LED) and a photosensor. Light emitted from the LED is reflected from the backside of the top sheet 371 of media and is detected by the photosensor as the media moves past the sensor 375. The light signal reflected from the manufacturer's marking is different from the light signal on the rest of the backside of the media, so that different spacings of identification bars (for example) can be detected as different spacings of peaks or valleys of optical reflectance. While the backside media sensor 375 is configured to work well with print media designed for the printer, a user can use a variety of media from other sources and the backside markings (if any) can not be recognized by the printer. Therefore, it is useful to have another means of distinguishing different media types. Thus, good printing can be provided for generic media of glossy, matte, plain or other types—perhaps not as optimized as media specified by the manufacturer, but still better than if no identification of generic media type had been made.

Carriage Sensor Assembly

Figure 5:
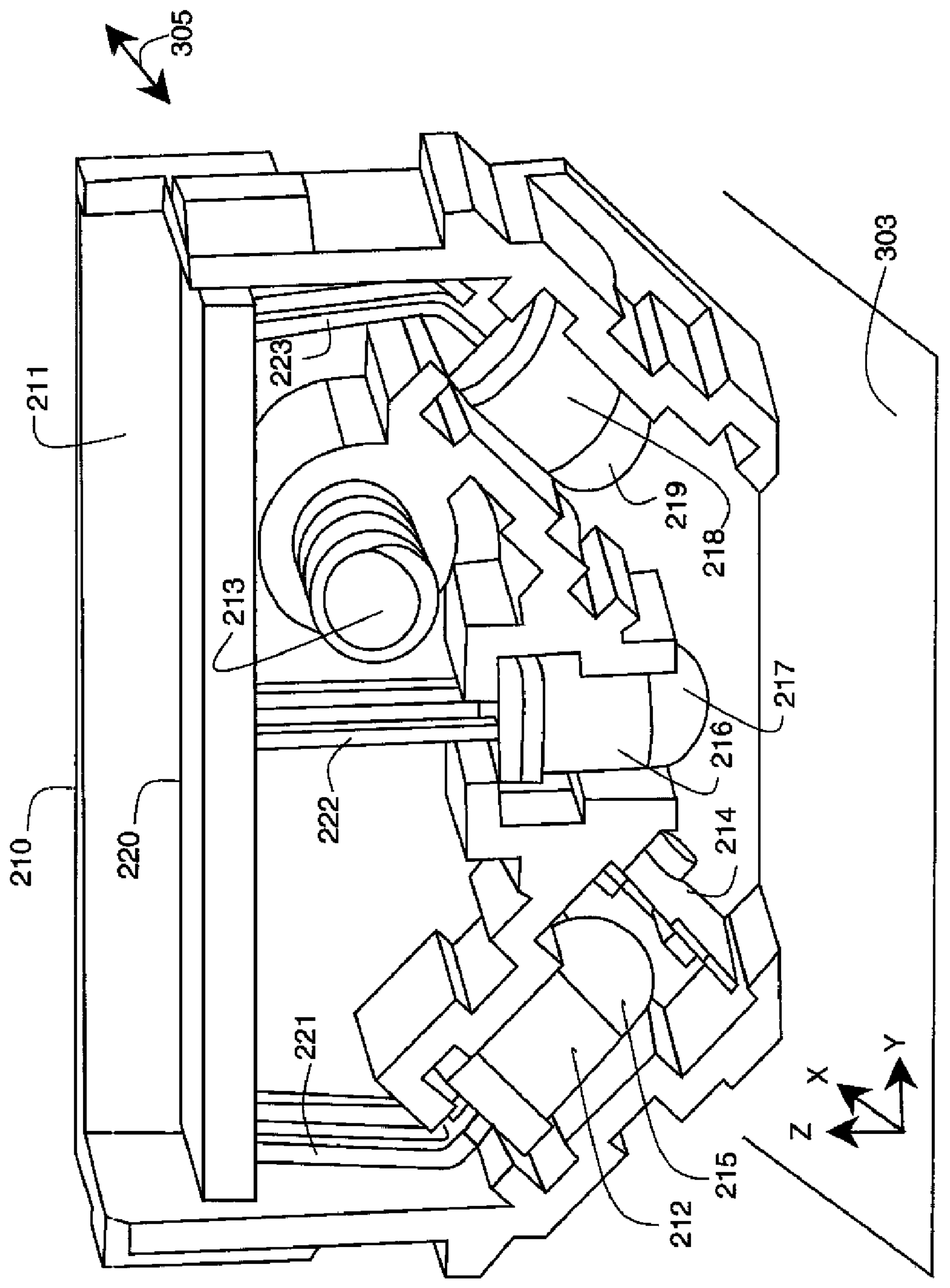
FIG. 5 is a perspective view of an embodiment of a carriage sensor assembly.

Shown schematically in FIG. 4 is carriage sensor assembly 210 of the present invention mounted on carriage 200. FIG. 5 shows a perspective view of the carriage sensor assembly 210, the frame 211 of which can be attached to carriage 200 by bolt 213, for example. Also shown in carriage sensor assembly 210 are photosensor 212, aperture 214, first LED 216 and second LED 218. The photosensor 212 and the two LED's 216 and 218 include semiconductor devices (not shown) that are encapsulated in optically clear materials that form lenses (215, 217 and 219 respectively). Lens 215 helps to focus light received through aperture 214 onto the photosensor device, while lenses 216 and 218 help to direct the emitted light toward the plane of the recording medium. Electrical leads 221, 222 and 223 from the photosensor 212 and the two LED's 216 and 218 are connected to a wiring board 220, and from the wiring board 220 to leads (not shown) that can be connected to an electronics board (not shown) that is attached to the carriage 200. It is preferable for the amplifier circuit to be physically close to the photosensor 212, because the photosensor output signal is relatively weak and it is important to avoid extraneous electrical noise, for example from printer motor cables, etc. The electronics board attached to carriage 200 can include the electronics for the powering of the LED's and for processing the photosensor signal, as described below.

FIG. 5 shows an orientation of carriage sensor assembly 210 that is appropriate for an embodiment in which the recording medium in the print zone 303 is located horizontally below the printhead 250 and the carriage sensor assembly 210 which are mounted on carriage 200. First LED 216 is oriented to emit light vertically downward along the Z direction, i.e. substantially normal to the XY plane of the recording medium in the print zone 303. In other words, the angle between the orientation of LED 216 and the normal to a plane parallel to the platen 303 is zero. Herein, the terms "plane of the recording medium in the print zone" and "plane parallel to the platen" will be used interchangeably, as the surface of the platen supports the recording medium in the print zone 303. The platen 303 can have regions of recesses as well as a series of protrusions for supporting the paper, but in such a configuration "a plane parallel to the surface of the platen" is meant herein to designate a plane that is determined by the surfaces of the protrusions upon which recording medium is intended to be supported. Photosensor 212 is configured to be on one side of first LED 216, and photosensor 212 is oriented to receive light along a direction that is at an angle of about 45 degrees with respect to the normal Z to the XY plane of the platen (and pointing toward the back of the printer so that it does not receive external stray light) in this example. Second LED 218 is configured to be on the other side of first LED 216, and second LED 218 is oriented to emit light at substantially the same angle with respect to the normal Z, as the photo sensor 212, but on the other side of the normal. In this example, second LED 218 is oriented to emit light along a direction that is around 45 degrees from the normal to the plane of the recording medium in the print zone. In other embodiments, the angle between the normal Z and the photosensor 212 on one side and LED 218 on the other side can range between 30 and 60 degrees, but the angle for each should be the same. Thus, the two LED's are configured relative to the photosensor in this embodiment of the invention such that the photosensor 212 receives specular reflections of light incident on the recording medium from second LED 218, and photosensor 212 receives diffuse reflections of light incident on the recording medium from first LED 216. Photosensor 212 provides an output signal (typically an output current) corresponding to the amount of light that strikes the photosensor 212.

Aperture 214 determines the range of angles of incident light rays that are able to pass to the photosensor 212, while the opaque region around the aperture blocks light rays outside this range of angles. The region of the recording medium that the photosensor "sees" depends not only on the geometry of the aperture, but also upon its orientation relative to the plane of the recording medium. This region that the photosensor "sees" will also herein be called the photosensor's field of view. In the embodiment shown in FIG. 5 where the axes of the photosensor 212 and the aperture 214 are inclined relative to the Y direction (where Y is the media advance direction), the field of view of photosensor 212 through aperture 214 will be somewhat elongated along the Y direction even if the physical shape of the aperture 214 is circular. To modify the field of view of the photosensor, aperture shapes that are somewhat elongated (such as rectangles or ovals) with the longer dimension of the aperture having a component along either X or Y can be used (where X is the carriage scan direction). Aperture shape can be designed to enhance the ratio of signal to background noise for the patterns intended to be sensed on the paper. For example, a field of view of approximately the same size as marked region within an alignment pattern can be desired. For a typical spacing of carriage sensor assembly 210 to the paper in print zone 303, an aperture having an oval shape of dimensions 0.5 mm by 0.3 mm can provide a photosensor field of view of around 2.0 mm along Y by 1.5 mm along X. The use of an aperture rather than an external lens (i.e. a lens in addition to the integrated lenses 215, 216 and 218 described above) is cost advantaged, but also provides a weaker signal so that novel electronics and data processing methods are needed, as described below. However, the use of an aperture also enables the use of inexpensive off-the-shelf LED's and photosensor without requiring special lens designs for those components. In this example, the axis of the aperture 214 is parallel to the axis of the photosensor 212, and both are oriented at an angle with respect to the normal to the platen. Herein, the term "the aperture is oriented at a first angle" will be used interchangeably with "the axis of the aperture is oriented at a first angle".

Figure 6:
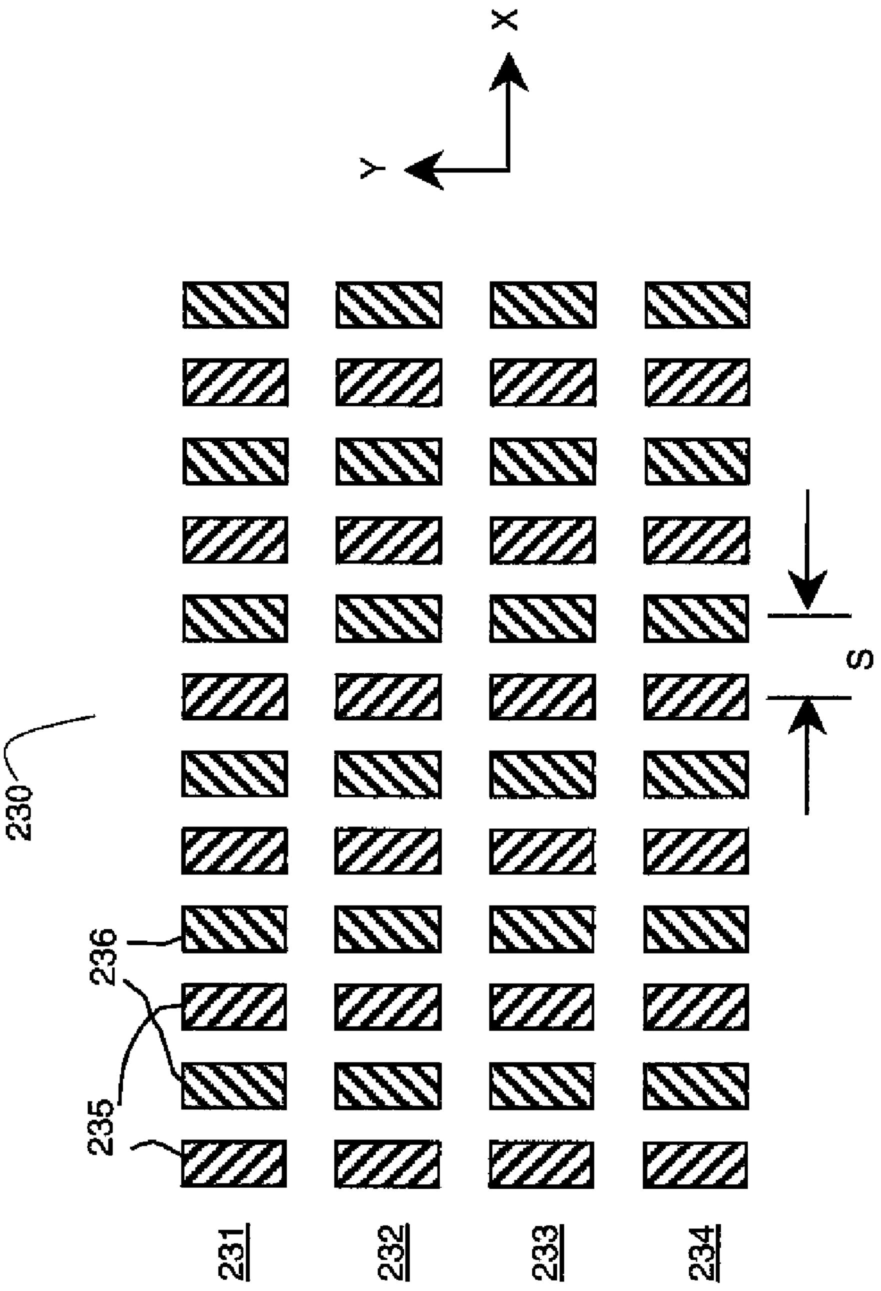
FIG. 6 is a schematic representation of an alignment pattern.

FIG. 6 shows a representation of a type of pattern that can be used for various types of alignment. The alignment pattern 230 of FIG. 6 includes a plurality of rows (231, 232, 233, 234) of first type bars 235 and second type bars 236, where the first type bars 235 and the second type bars 236 are alternated within the rows. A first type bar 235 is displaced from its neighboring second type bar 236 within a row along the X direction (the carriage scan direction). Rows are displaced from each other along the Y direction (the paper advance direction). Different types of alignment will use different specifications for what a first type bar 235 and a second type bar 236 should be. For color to color alignment (or array to array alignment) the first type bars 235 will be printed by marking elements (e.g. inkjet nozzles) corresponding to a first color or a first array, while the second type bars 236 will be printed by marking elements corresponding to a second color or a second array. Note: the photosensor signal can tend to be larger for some colors, or for patterns printed by nozzles that are larger relative to patterns printed by nozzles that are smaller. In such situations, one can adjust the dot density of the alignment bars so that the magnitude of the photosensor signals are comparable. For bidirectional alignment, the first type bars 235 can be printed by a group of marking elements while the carriage is moving from left to right, while the second type bars 236 can be printed by the same group of marking elements while the carriage is moving from right to left. For angular alignment, the first type bars 235 can be printed by a group of marking elements near one end of the array of marking elements, while the second type bars 236 can be printed by a group of marking elements near the other end of the array of marking elements. For odd-even alignment, the first type bars 235 can be printed by nozzles in one row of a nozzle array, and the second type bars 236 can be printed by nozzles in another row of the nozzle array. Although the alignment patterns differ in detail, the goal is to find the average center-to-center distance S between a first type bar 235 and its neighboring second type bar 236 to a high degree of accuracy.

It is found that the signal received in photosensor 212 from specular reflections of light emitted from LED 218 is highly sensitive to the shape of the surface of the recording medium. When trying to detect bars 235 and 236 of an alignment pattern, the variations due to paper shape are too large relative to the signal of the colored bars when using specular reflections. Therefore specular reflection LED 218 is not used when measuring alignment patterns. Paper shape noise is much less for diffuse reflections, so LED 216 is used when measuring alignment patterns. Even for the diffuse reflection signal, there is significant background noise, so that if the alignment patterns are to be measured accurately, the signal needs to be enhanced relative to the background.

Figures 7, 7A, 7B, 7C, 7D, 7E, 7F, 7G, 7H, 7I, 7J:
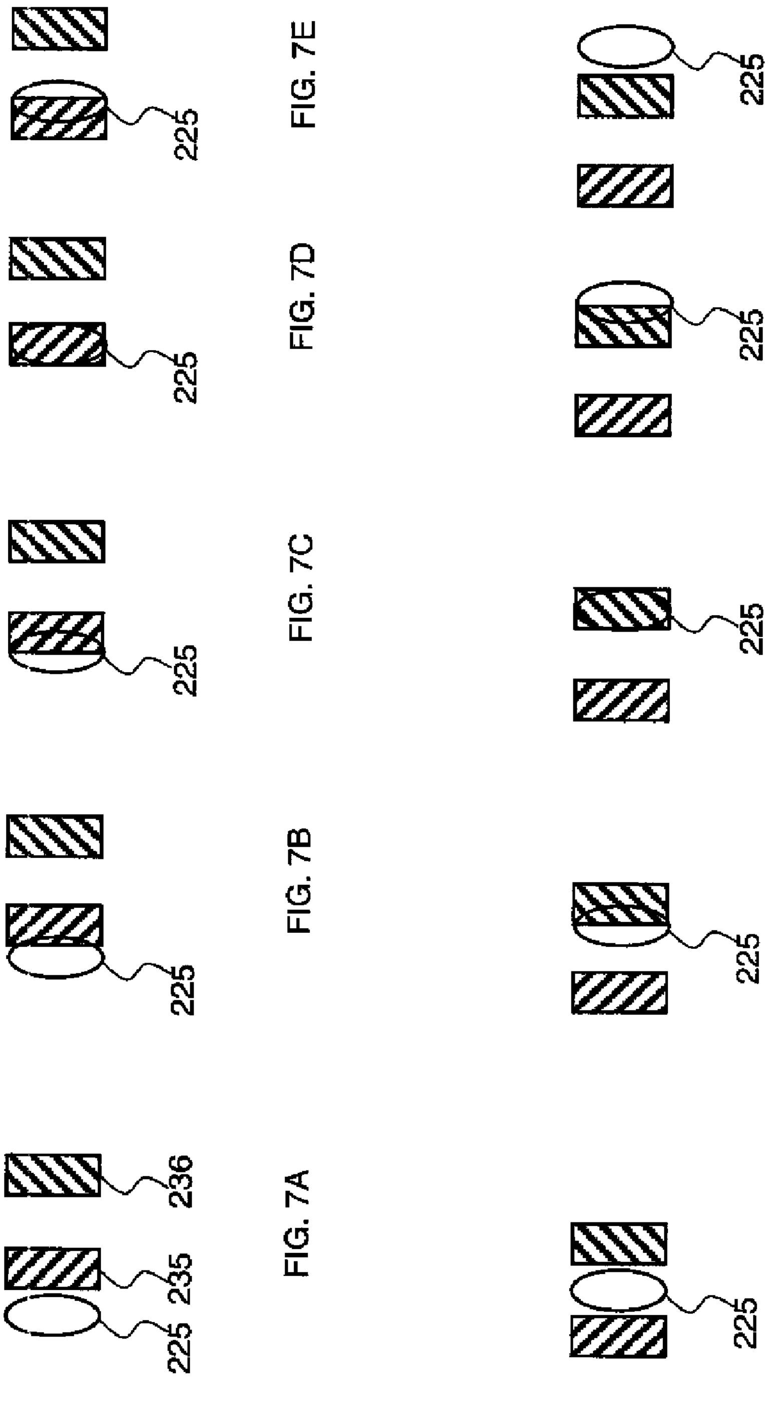
FIG. 7*a-j* is a schematic representation of the field of view of the photosensor of the carriage sensor assembly, as it moves relative to a portion of an alignment pattern.
Figure 8:
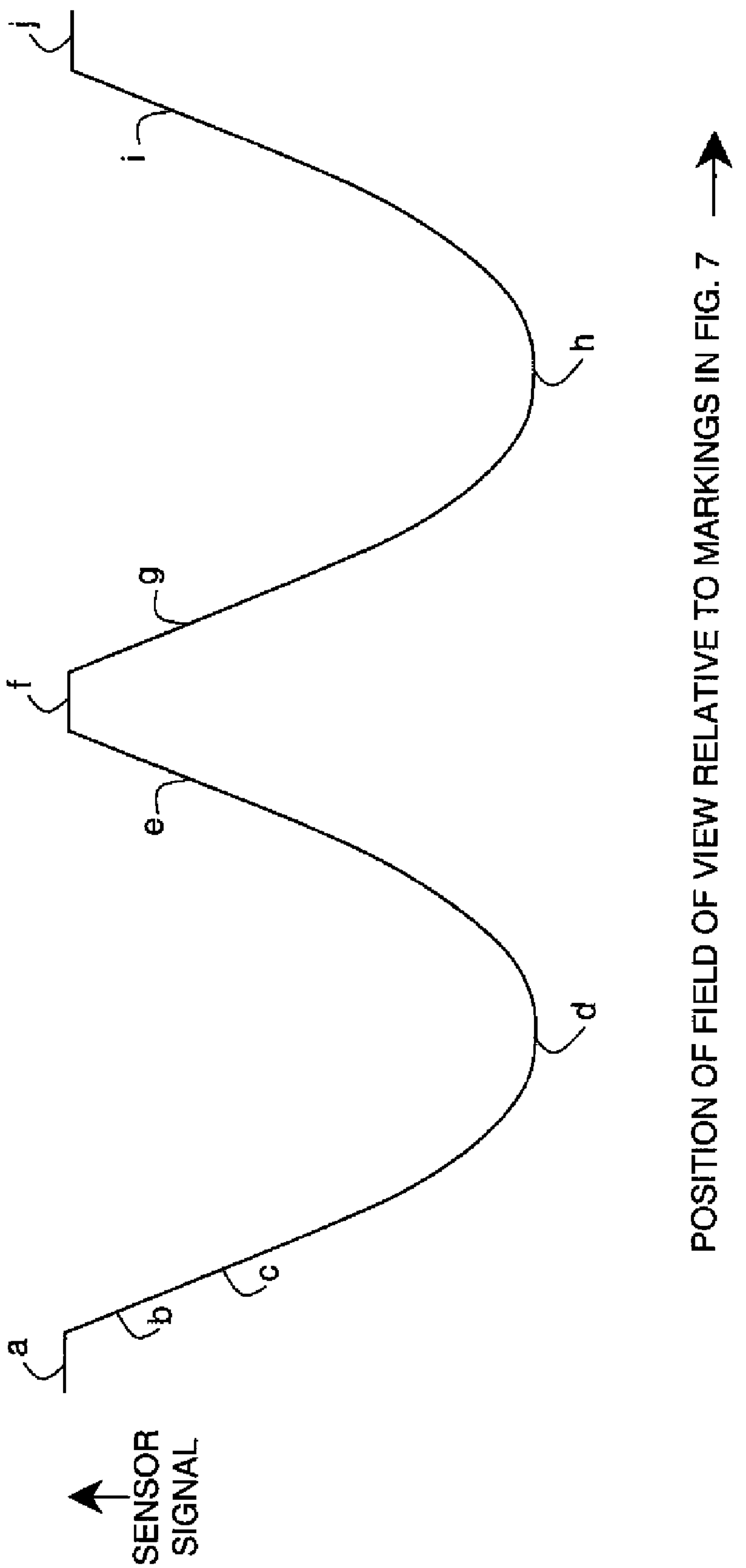
FIG. 8 is an idealized plot of the signal from the photosensor corresponding to the positions of the field of view represented in FIG. 7*a-j;*

FIG. 7 shows schematically the relation of the field of view 225 of photosensor 212 through aperture 214 as carriage sensor assembly 210 moves with carriage 200 across a portion of an alignment pattern 230 (the recording medium having first been positioned relative to field of view 225 so that a plurality of alignment bars can successively enter and exit the field of view as the carriage is moved). The same two alignment bars 235 and 236 are shown in FIGS. 7*a*-7*j* (although bars 235 and 236 are labeled only in FIG. 7*a*). FIGS. 7*a*-7*j* can be thought of as a sequential series of snapshots of the field of view 225 moving in relationship to the two alignment bars 235 and 236. FIG. 8 is an idealized plot of the signal from photosensor 212 as light emitted from LED 216 is diffusely reflected by the alignment pattern. In FIG. 8 points a-j of the idealized signal correspond to the positions of the field of view shown in FIGS. 7*a*-7*j* respectively. In FIG. 7*a*, the field of view 225 includes only white paper, so the idealized signal in FIG. 8 point a is at a maximum. In FIGS. 7*b* and 7*c*, the field of view 225 includes more and more of alignment bar 235, so the idealized signal in FIG. 8 points b and c successively decreases, because less reflected light is received by photosensor 212. In FIG. 7*d*, field of view 225 includes the largest portion of alignment bar 235 that is possible, so the idealized signal in FIG. 8 point d is a minimum. In FIG. 7*e*, field of view 225 is moving beyond alignment bar 235 so that more white paper is in the field of view, and the idealized signal in FIG. 8 point e increases accordingly. In FIG. 7*f*, field of view 225 is between alignment marks 235 and 236 so that only white paper is seen, and the idealized signal in FIG. 8 point f increases to substantially the same level as in FIG. 8 point a. In the same way, increasing and then decreasing portions of alignment bar 236 are in the field of view 225 in FIGS. 7*g-j* and the idealized signal in FIG. 8 points g-h decreases and then increases accordingly. Although points d and h in FIG. 8 can look like valleys, when the sensor signal is inverted, points d and h will be peaks. The points in the idealized photosensor signal where the field of view contains the maximum amount of marked region (like points d and h) will be called peaks herein. Note that in the example of FIG. 8, peaks d and h are slightly broadened because field of view 225 is slightly more narrow than bars 235 and 236. Because it is desired to determine the distance between peaks d and h with great accuracy, it is generally desirable to design the alignment bars 235 and 236 to be about the same width or smaller than the field of view 225 so that the peaks are as sharp as possible. The white space between bars should be larger than the field of view so that adjacent bars can be independently sensed. One other factor, not taken into consideration in the simple schematic representation shown in FIG. 8, is that the sensitivity varies within the field of view, being maximized near the center, and dropping off toward the edges of the field of view.

The x axis of FIG. 8 is labeled "position of field of view relative to markings in FIG. 7". Spatially the distance between peaks d and h is the center to center distance S between two adjacent alignment bars, which can be 0.2 inch, for example. That distance is converted into the time or frequency domain by the scanning speed v of the carriage, which can be 10 inches per second for example. Thus, if there are a series of alignment bars 235 and 236 in a row as in FIG. 6 where S is 0.2 inch, the frequency f at which alignment bar centers (peaks) are detected is $$f=v/S,$$

for a frequency f of 50 Hz in this example. In other words, the photosensor output signal varies in time, and has a frequency component of primary interest in this example of v/S=50 Hz.

The terminology "idealized photosensor signal" is used above in order to illustrate how an alignment pattern can be sensed. The problem is that actual photosensor signals are much noisier than shown in FIG. 8. The noise distorts the signal so that it is difficult to determine where the peaks are and what the distance between them is. Unless the signal can be clearly distinguished from the background noise, sufficiently accurate measurement of alignment patterns will be difficult.

Figure 9:
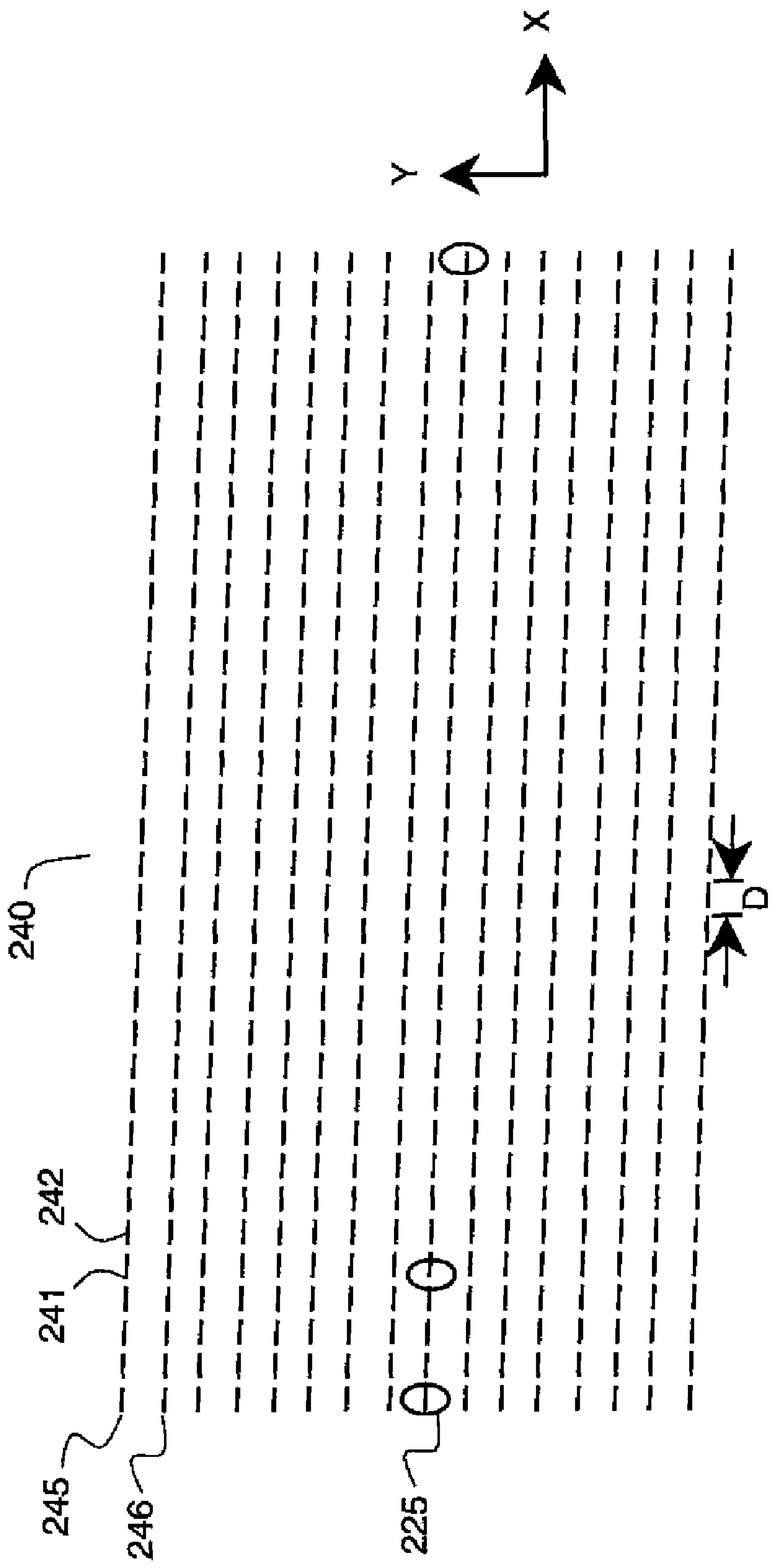
FIG. 9 is a schematic representation of a portion of a diagnostic pattern for the identification of malfunctioning marking elements, together with the field of view of the photosensor.

In addition to alignment, a second function that can be accomplished by detecting marks on the recording medium is the identification of marking elements which are malfunctioning. FIG. 9 shows a typical diagnostic pattern for malfunctioning marking elements (also called bad jet detection, in the case of an inkjet printhead). In the pattern 240 shown in FIG. 9, each marking element prints a short line segment 241, 242, . . . at a known center-to-center spacing D. The segments can be arranged in a plurality of rows 245, 246, . . . . The line segments correspond to different marking elements, so that if a segment is not detected at its expected position, that marking element is categorized as malfunctioning. In order to compensate and provide improved print quality, the malfunctioning marking elements can be deactivated, and their workload assigned to other marking elements. The focus of an embodiment of the present invention is not the methods of compensation, but rather how the malfunctioning nozzles are correctly identified. Thus, similar to the case of an alignment pattern, the carriage sensor assembly 210 is scanned across the paper such that different line segments sequentially enter and leave the field of view. Again, it is necessary to enhance the photosensor signal corresponding to the line segments relative to the background noise, including from light scattered from the paper itself. In the same way that it is preferable to use diffuse reflections from LED 216 for detecting alignment pattern bars 235, 236, it is also preferable to use diffuse reflections from LED 216 for detecting line segments 241, 242 to identify malfunctioning marking elements. A further method of increasing the photosensor signal for detecting line segments 241, 242 etc., is to print a series of multiple parallel line segments from each marking element in multiple printing passes rather than a single line segment, but herein either type of pattern will be referred to as line segment, such as line segment 241.

Field of view 225 is also shown in several representative positions in FIG. 9. Note that at the left side of a row of line segments 241, the line segment is positioned toward the top of the field of view 225, but can be totally contained within the field of view. At the right side of a row of line segments 241, as the row slants downward corresponding to line segment positions due to being printed by different nozzles in the array, the line segment is positioned toward the bottom of the field of view 225, but can still be totally contained within the field of view. Further note that in this example, adjacent line segments 241, 242 have been packed sufficiently close that as one line segment is leaving the field of view, the adjacent line segment is entering the field of view. Such tight packing is done in order to make the bad jet detection pattern more compact so that it can be scanned more quickly. Unlike the case of alignment bar patterns, the idealized photosensor signal for this bad jet detection pattern of FIG. 9 will not have regions such as f and j where a constant maximum signal is generated, corresponding to a region of white paper between adjacent line segments. Rather the idealized curve will appear more sinusoidal.

Because both alignment patterns 230 and bad jet detection patterns 240 typically include marks of a range of colors including cyan, magenta, yellow and black, it is important to use an LED 216 having a wavelength such that photosensor 212 can provide a signal from colors. In one embodiment, LED 216 is chosen to have a wavelength that peaks in or near the yellow region of the visible spectrum. It is known that typical LED's provide a range of wavelengths rather than a single wavelengths. Still, it would be recognized, for example, that a yellow LED has a longer characteristic wavelength than a blue LED. Using a yellow (or amber or yellow green) LED 216, a reasonable strength signal can be provided in the photosensor 212 from the diffuse reflections from cyan, magenta and black. Yellow alignment bars 235, 236 or yellow line segments 241, 242 would not be "seen" very well by photosensor 212 with yellow illumination. However, human observers are much less sensitive to defects in yellow than in the other colors, so neglecting alignment errors in yellow or malfunctioning nozzles in yellow can still provide satisfactory images. Optionally, one can use a second LED (not shown) configured to provide diffuse reflections to the photosensor 212, where the second diffuse LED emits light of a wavelength (e.g. blue) that will provide a signal for the yellow marks.

Specular reflections from LED 218 are very sensitive to paper shape and can be used as a means to detect generic paper types (such as glossy photo paper, matte photo paper, and plain paper) by the characteristics of the noise in the photosensor signal from an unmarked printing surface of recording medium. Unlike backside media sensor 375, which can detect media type as it is being fed from the paper tray, the carriage sensor assembly 210 cannot detect generic paper type until the recording medium has reached print zone 303. If the backside media sensor 375 has not identified a specific paper type, the carriage sensor assembly 210 can be used. In particular, the specular LED 218 emits light (and not diffuse LED 216) while scanning across the recording medium prior to the printhead beginning its print job, and the signal is analyzed to determine the paper type, so that the proper data rendering can be done for good image quality on that paper type. The choice of wavelength of the specular LED 218 is not critical, but can be blue, for example.

The intensity of emitted light from LEDs 216 and 218 can be varied by modulating the pulse width of their power sources. Thus, if the output signal 342 from the photosensor 212 is too weak or too strong, one can adjust the pulse width modulation after calibration.

Analog Circuitry for Carriage Sensor Signal

As mentioned above, the output signal 342 from photosensor 212 is relatively weak relative to background noise. Both analog circuitry and subsequent digital data processing can be used to enhance the signal 342 relative to the background noise. In this section, analog circuitry used in an embodiment of this invention will be described.

Figure 10:
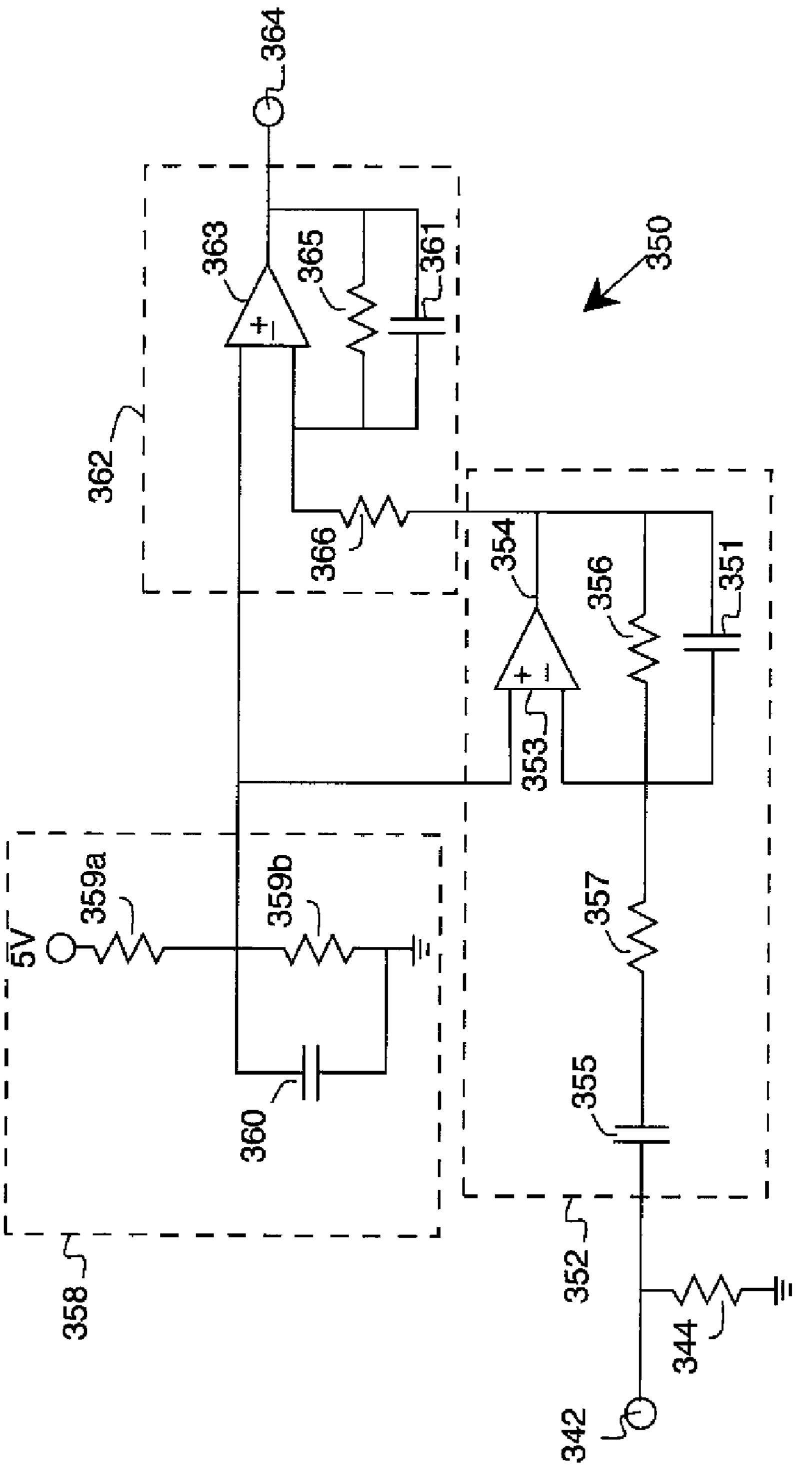
FIG. 10 is a circuit diagram of a portion of an amplifier circuit for the photosensor signal.

FIG. 10 shows a circuit diagram of an amplifier circuit 350 for the output signal 342 from photosensor 212. Amplifier circuit 350 can be located on wiring board 220 (FIG. 5) or otherwise attached to carriage 200 for example. The purpose of amplifier circuit 350 is to amplify the signal and condition the signal such that the portion of interest can be properly represented by the full range of an 8 bit analog to digital converter (ADC). The ADC is not shown in FIG. 10, but the signal that is output from amplifier circuit 350 is output 364. The design of the amplifier circuit 350 must be compatible with the requirements of photosensor signal conditioning for detection of marked patterns with diffuse reflections (e.g. for alignment or for malfunctioning marking elements), as well as for detection of paper type with specular reflections. Three sections of amplifier circuit 350 are outlined in dashed boxes 352, 358 and 362. The output signal 342 from photosensor 212 is input to section 352. Although the photosensor signal is a current, it is converted to a voltage by resistor 344. Section 352 also includes operational amplifier 353, AC coupling capacitor 355, stabilizing resistor 357, and feedback resistor 356. AC coupling capacitor 355 has the important effect of blocking out the DC portion of the photosensor signal 342. Whether the photosensor signal is due to sensing marked patterns with diffuse reflections or paper type with specular reflections, the photosensor signal generally has a significant DC component due to background light received. The DC level of the photosensor current is not of interest, and the DC level would otherwise waste resolution in the ADC, so that a more expensive 10 bit or 12 bit ADC would be needed rather than an 8 bit ADC to fully represent the portion of the photosensor signal that is of interest. Capacitor 355 (disposed between the photosensor signal 342 and the negative input of operational amplifier 353) also works with feedback resistor 356 to cause operational amplifier 353 to function as an analog differentiator. In other words, section 352 of amplifier circuit 350 provides a signal that is related to the time derivative of the photosensor signal 342. It is well known that analog differentiators can have high gain at high frequency, which is undesirable in this application, because much of the background noise is high frequency. As is well known, a simple analog differentiator consisting of an operational amplifier, a capacitor C on the negative input, and a feedback resistor R between the negative input and the output has an output voltage $$V_{out}=-RCdV_{in}/dt.$$

Figure 11:
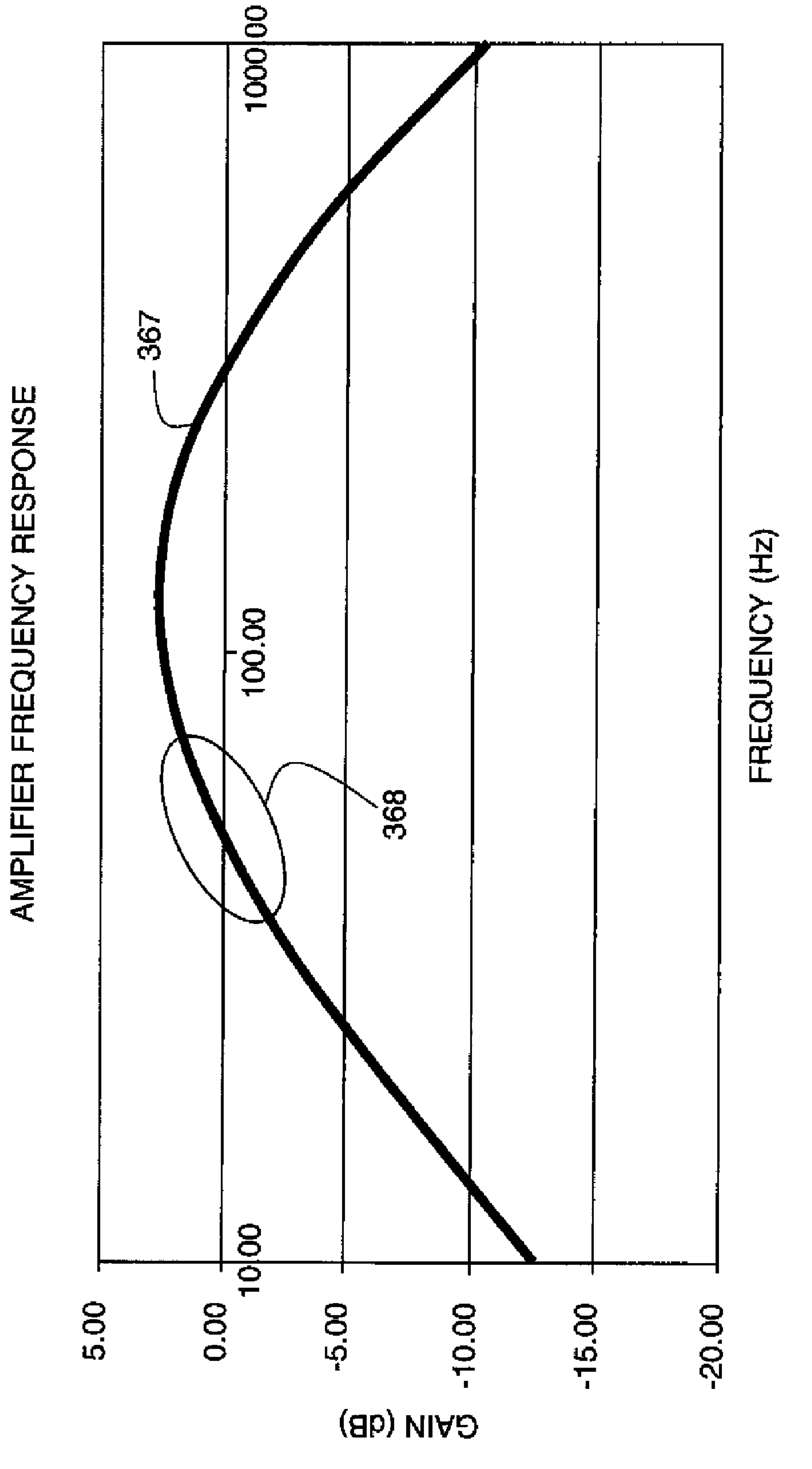
FIG. 11 is a plot of the gain versus frequency for the amplifier circuit of FIG. 10.

For such a circuit, an input signal $V_{in}=A\sin(\omega t)$ will lead to an output signal of $V_{out}=-RCA\omega\cos(\omega t)$. Therefore high frequency limiting capacitor 351 is included to limit the high frequency gain. In addition, stabilizing resistor 357 is inserted in series with AC coupling capacitor 355 in order to stabilize the analog differentiator against oscillation. The overall amplifier response is shown in FIG. 11. The amplifier gain peaks at corner frequency 367, which is about 160 Hz in the circuit design of this example. In the region significantly below the corner frequency, circuit section 352 operates substantially as an analog differentiator. This includes the frequency $f_1$ of interest 368, which can range around 50 to 80 Hz, corresponding to the scanning speed (~10 inches per second) of the carriage sensor assembly 210 divided by the center to center spacing of the alignment bars (S~0.2 inch) or bad jet detection line segments (D~0.125 inch), for example. At frequencies above the corner frequency 367, the amplifier gain decreases. In typical designs of amplifier circuit 350, the corner frequency 367 can be between 20 Hz and 2000 Hz. Amplifier circuit design is chosen such that the frequency range of interest 368 will be sufficiently close to corner frequency 367 that gain is relatively high, but also sufficiently below corner frequency 367 that substantially a time derivative of the photosensor signal 342 is provided. A time derivative is provided for frequency components of the signal where the frequency is less than or equal to $f_0$, where $f_0$ is on the order of half the corner frequency 367.

Output 354 of circuit section 352 is fed as an input to operational amplifier 363 in a second amplifier stage (circuit section 364). The gain of the second stage is essentially the ratio of feedback resistor 365 to input resistor 366, and is approximately 50 in this example. In other examples, the ratio of the feedback resistor 365 to the input resistor 366 can be selected to be between 5 and 1000, providing a corresponding gain of 5 to 1000. High frequency gain of circuit section 364 is limited by capacitor 361 in parallel with feedback resistor 365. The second stage of amplification of the time derivative of the photosensor signal causes the range of that signal to be approximately the range of the 8 bit ADC for black patterns, which tend to provide the strongest photosensor signal. It is important for the amplifier not to clip the signal, so the amplifier gain must be designed such that the strongest signal does not exceed the full range of the ADC. The 8 bit ADC has 256 levels ranging from 0 volts to 3.3 volts. Circuit section 358 biases both operational amplifier 353 and 363 so that their outputs will be centered in that range. In particular, section 358 includes resistors **359*a* and 359*b* which form a voltage divider 359 between 5 volts and ground. Capacitor 360 in parallel with resistor 359*b* helps to reduce electrical noise. The resistors of voltage divider 359 are set to be approximately 100K for 359*b* and 200K for 359*a* in this example, so that the voltage that is input to the positive inputs of both operational amplifiers 353 and 363 is equal to (100/(100+200))×5 volts ~1.67 volts. This is essentially in the middle of the range of the ADC. Referring again to the ideal photosensor signal of FIG. 8, at points such as a, d, f, h and j where the photosensor signal is flat, the time derivative is 0, but this would be biased by circuit section 358 to be represented by about 1.67 volts in the ADC corresponding to around the middle level 128 in an 8 bit ADC having 256 levels. Points such as b, c and g have opposite signs of time derivative as points e and i, so portions of the signal having a negative time derivative are represented in the ADC as levels lower than level 128**, and portions of the signal having a positive time derivative are represented by levels higher than 128.

Once the amplified and biased time derivative of the photosensor signal has been digitized in the ADC, digital signal processing can be used to further enhance the signal relative to background noise. (For some applications such as measuring peak distances in alignment patterns, the time derivative signal from the ADC will be subsequently numerically integrated to represent the original shape, but the offset that was added in the analog biasing portion will be removed at that time.) The details of the digital signal processing are similar but differ in some details for the cases of detecting marked patterns for alignment and for malfunctioning jets. The details for digital signal processing for distinguishing among media types is more different. The different cases will be described separately.

Processing Digitized Signals for Alignment Patterns

Figure 12:
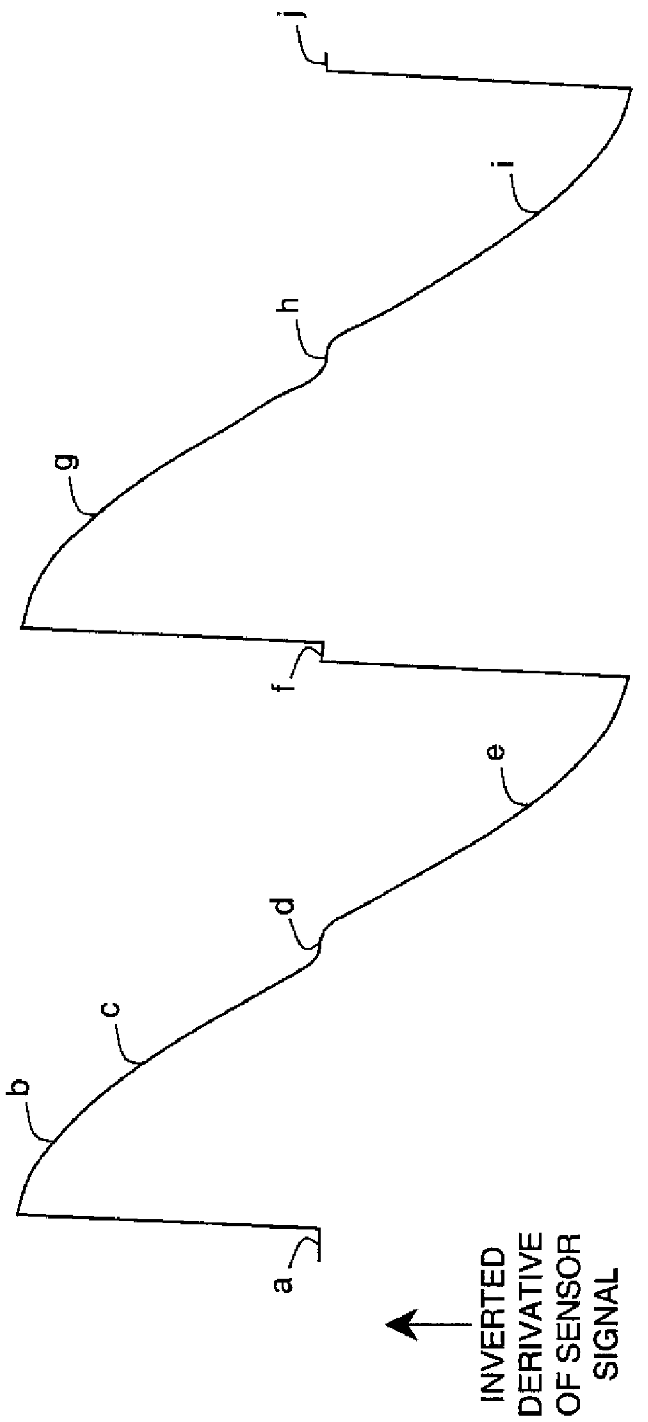
FIG. 12 is an idealized plot of the time derivative of the signal shown in FIG. 8.

The inverted, amplified and biased time derivative output of amplifier circuit 350 for the idealized photosensor signal of FIG. 8 would look approximately as shown in FIG. 12, where letters a through j apply to the same relative points as in FIGS. 7 and 8. (In reality, the sharp features of FIG. 12 would be somewhat rounded due to the reduced gain at high frequency for the amplifier circuit 350.) In this example the nominal alignment bar center to center spacing S is 0.2 inch. If the carriage sensor assembly is scanned at a speed of 10 inches per second, then the interval of time between points d and h would be 0.02 second. The time varying signal needs to be converted into spatial distances. In addition, actual signals are still much noisier than shown in FIG. 12, so more high frequency background noise must be averaged out of the signal.

The same linear encoder (not visible in FIG. 3, but located to the rear side of belt 384) that is used by the carriage printer to let the controller know the location of the printhead during printing is used to interpret the position of the carriage sensor during scanning. A typical linear encoder has a resolution of R=600 transitions per inch. Thus, every 1/600 inch the controller receives an encoder signal. If the carriage scanning speed v is 10 inches per second, then the frequency of encoder signals will be approximately Rv=6000 Hz. Since the nominal distance S between points d and h in FIGS. 7, 8 and 12 corresponds to 0.2 inch in this example, there will be approximately 120 encoder signals between points d and h.

One way to remove high frequency background noise and improve accuracy is to sample (or supersample) the ADC at a frequency that is significantly higher than the 6 kHz frequency of encoder signals. The averaged data is stored at a magnification of 100× so that the precision of the averaging is preserved. Because the signal of interest from the alignment pattern is varying comparably slowly, a fewer number of data points can be stored than the number in the sampled data set, but higher precision per data point is desired than in the original data set. The interval over which successive data points are averaged corresponds to the distance between encoder signals For example, if the sampling rate of the ADC is approximately F=100 KHz, one can average up to 16 adjacent data samples to provide the data point for the corresponding encoder signal. In genera, it is preferable to sample the ADC at a sampling frequency F>5 Rv. The sampling rate F is also greater than 100 times the characteristic frequency of the photosensor signal corresponding to the scanning of alignment bars (v/S~50 Hz), or the scanning of bad jet detection line segments (v/D~80 Hz).

Figure 13:
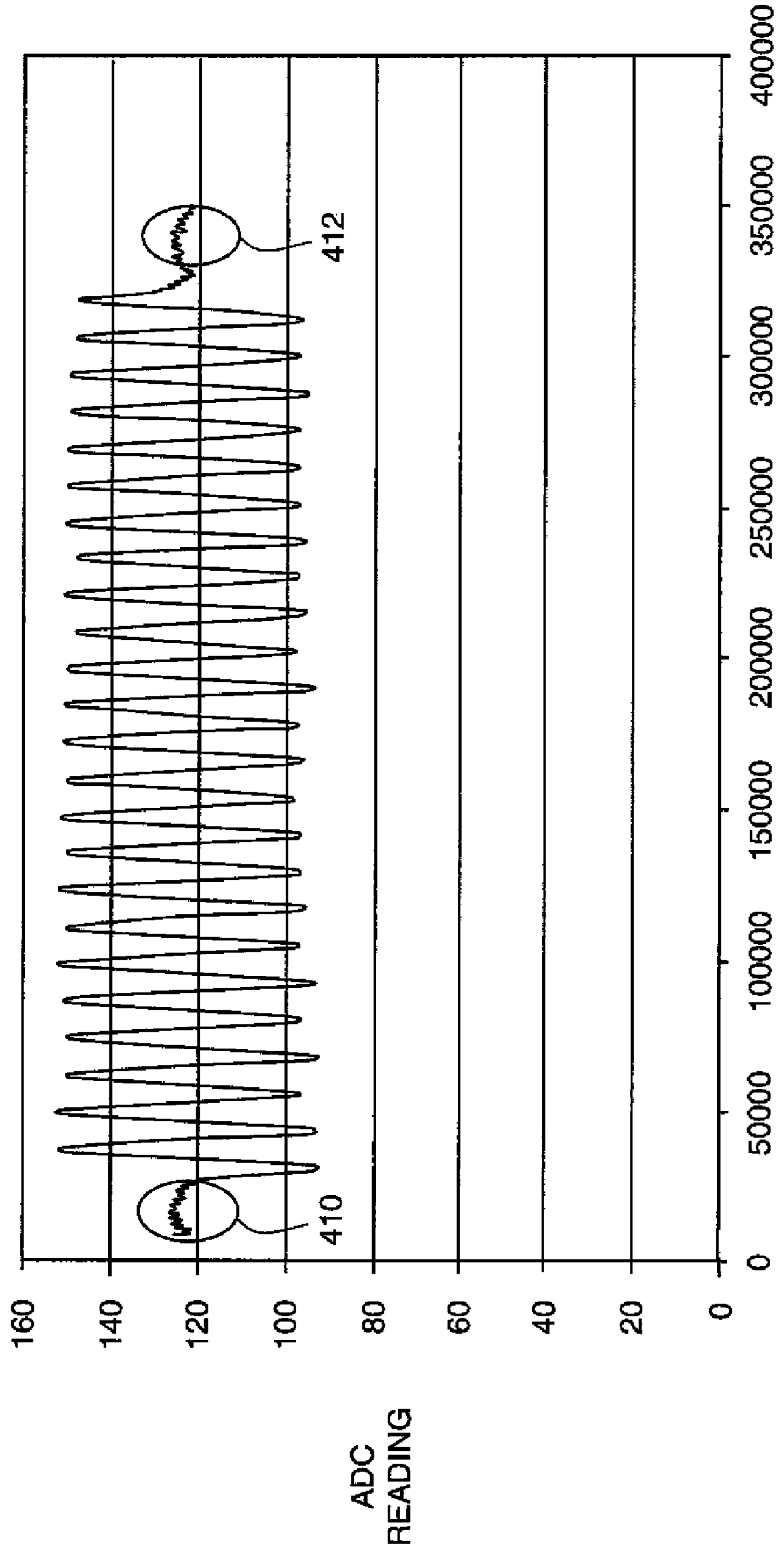
FIG. 13 is a plot of unprocessed output of digitized data corresponding to the photosensor signal corresponding to an alignment pattern, following amplification by the circuit of FIG. 10.

FIG. 13 shows an example of a plot of the unprocessed output of the 8 bit ADC for the case of an alignment pattern having 24 bars. Note that at the beginning of the plot (region 410) and at the end of the plot (region 412), where the photosensor field of view is white paper and the time derivative is nominally zero, the ADC value is near 128, as it has been biased to be near the center of its 256 level range. Note also that the background signal in regions 410 and 412 is somewhat noisy. The noisy background is also present in the region of the plot corresponding to the alignment bars, but it is less discernable. Still, this background noise interferes with accurate measurement of the distance between the centers of the alignment bars.

Figure 14:
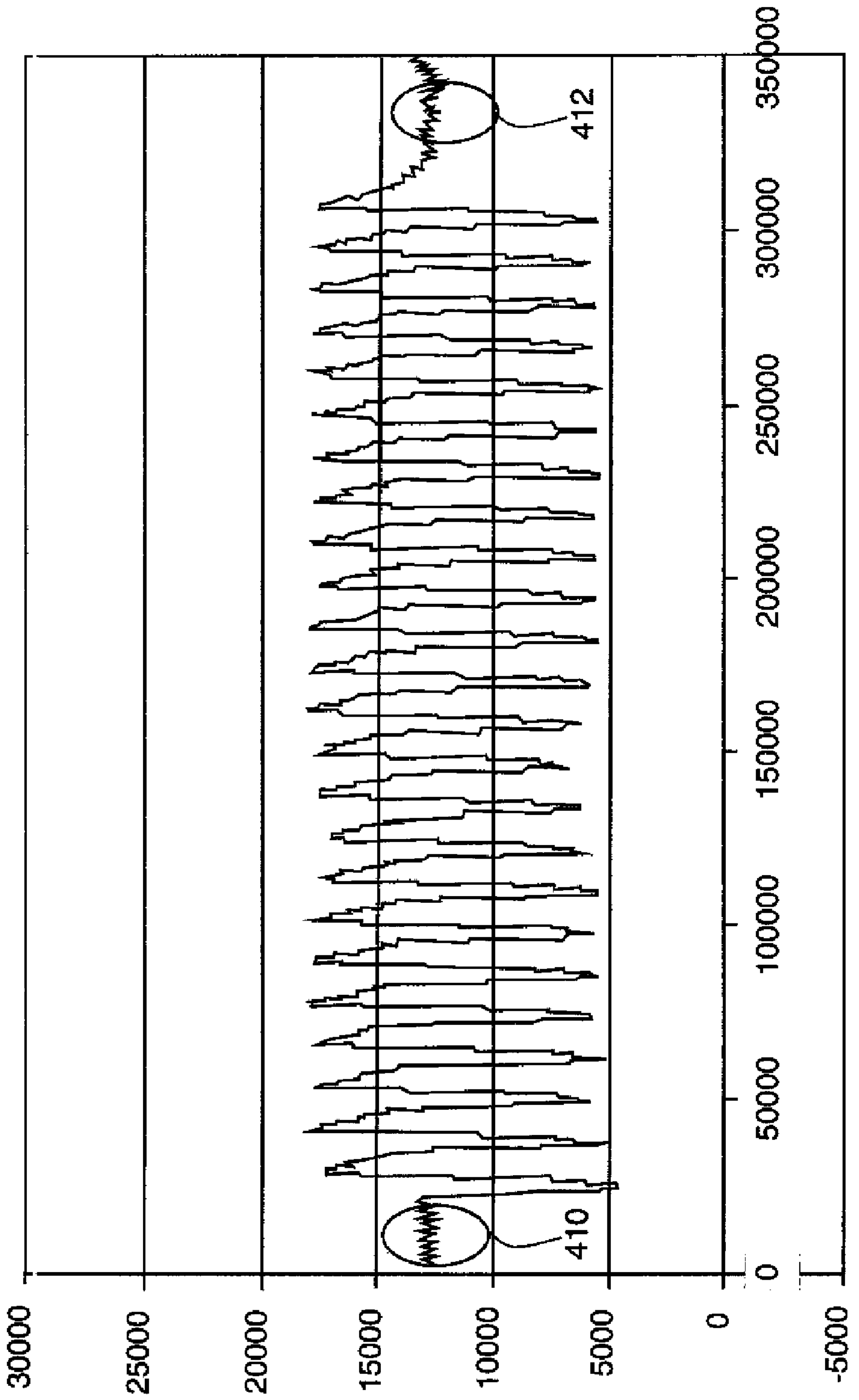
FIG. 14 is a plot of the data of FIG. 13 after averaging adjacent data points and multiplying by 100.

FIG. 14 shows an example of a plot of the data of FIG. 13, after averaging adjacent data points and multiplying by 100 to provide higher integer precision. Note that the scale of FIG. 14 is different than FIG. 13. Also note that the size of the background noise evident in regions 410 and 412 is significantly smaller relative to the signal of the alignment bars as compared to the same regions in the raw ADC data shown in FIG. 13.

Figure 15:
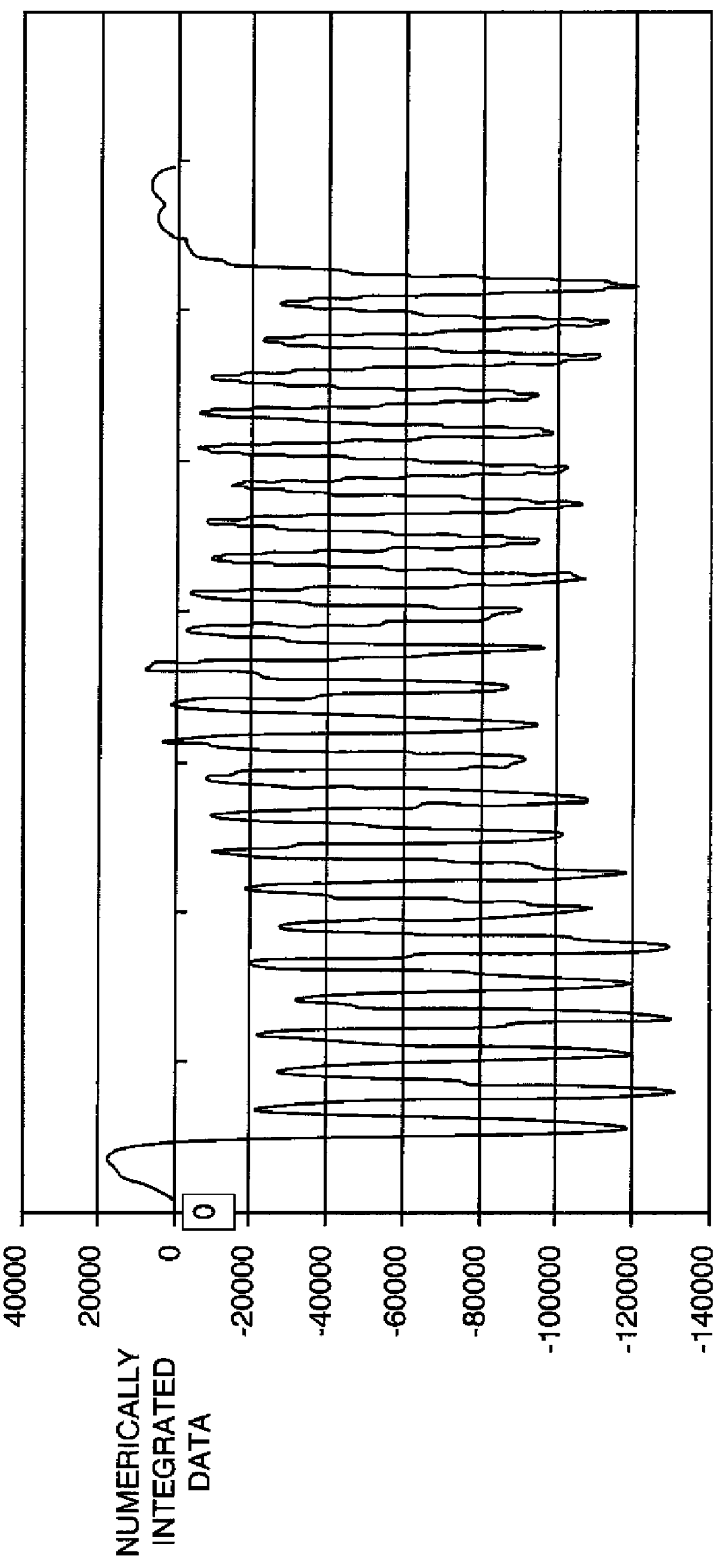
FIG. 15 is a plot of the data of FIG. 14 after numerical integration and removal of the offset.

Referring back to FIGS. 8 and 12, the time derivative signal that was provided by amplifier circuit 350 to the ADC looks more like FIG. 12 than FIG. 8. The peak structure of the signal (corresponding to the field of view of the photosensor moving past each alignment bar) can be restored by numerically integrating the digitized data that is represented in FIG. 14. This numerical integration also further smoothes the data. In one embodiment, the numerical integration is done as follows: 1) estimate the offset by averaging over all N data points P of FIG. 14 (one data point for each of the N encoder signals). This yields a number $P_{ave}$ which is approximately $P_{ave}$~12,500. 2) Let the summed data point (of FIG. 14) corresponding to the nth encoder signal be $P_{sum}(n)$ and let the integrated signal at the nth encoder signal be $P_{int}(n)$ and set the first integrated point to 0, i.e. $P_{int}(1)=0.4$). Remove the offset by integrating the difference between $P_{sum}(n)$ and $P_{ave}$ for each value of n, starting at n=2, i.e. $P_{int}(n)=P_{int}(n-1)+P_{sum}(n)-P_{ave}$. FIG. 15 shows a plot of the resulting integrated signal. In the convention of FIG. 15, the peaks corresponding to the center of the alignment bars appear as valleys rather than as peaks. The operation of subtracting out the average value will be referred to herein as removing the offset.

In one embodiment $2^{nd}$ order polynomials are fit to the peaks (valleys) corresponding to the data shown in FIG. 15. The polynomial curve fitting helps to compensate still further for noise. The positions of the maxima of the peaks are identified. Because the data sampling is done at a higher precision than the distance between encoder signals, the distance between peaks can be provided within a fraction of an encoder spacing (for example to 4800 per inch). Referring again to FIG. 6, there are multiple copies of first bars 235 adjacent to second bars 236 within a row of alignment patterns. The center-to-center spacings S between 10 pairs (for example) of alignment bars 235 and 236 are averaged over the pair differences that correspond to adjacent maxima or minima.

The data corresponding to FIG. 15 can be still too noisy to provide the accuracy required in spacings S between alignment bar types 235 and 236, for example, due to low frequency paper shape noise. Note, for example in FIG. 15 that the peak height varies substantially from bar to bar. In another embodiment, the integrated data corresponding to FIG. 15 is processed by a high pass digital filter. An example of a high pass digital filter is a third order Butterworth filter, which attenuates variations below a specified cutoff frequency, but passes (substantially unaltered) data that is above the cutoff frequency. Higher order Butterworth filters approach the behavior of an ideal high pass filter more nearly, but also require more digital signal processing time. Commercially available software programs specify the filter parameters on the basis of the cutoff frequency and the order of the Butterworth filter desired. In one particular example, a $3^{rd}$ order Butterworth filter was chosen having the following parameters: a=[−0.9391, 2.8173, −2.8173, 0.931] and b=[1, −2.8744, 2.7565, −0.8819], or more generally $a=[a_1,a_2,a_3,a_4]$ and $b=[b_1,b_2,b_3,b_4]$. If, as above, the integrated signal at the encoder signal n is $P_{int}(n)$, and if the first three filtered data points are set to 0, then the filtered data signal is given by $$b_1P_{fil}(n)=a_1P_{int}(n)+a_2P_{int}(n-1)+a_3P_{int}(n-2)+a_4P_{int}(n-3)+b_2P_{fil}(n-1)+b_3P_{fil}(n-2)+b_2P_{fil}(n-3).$$

Figure 16:
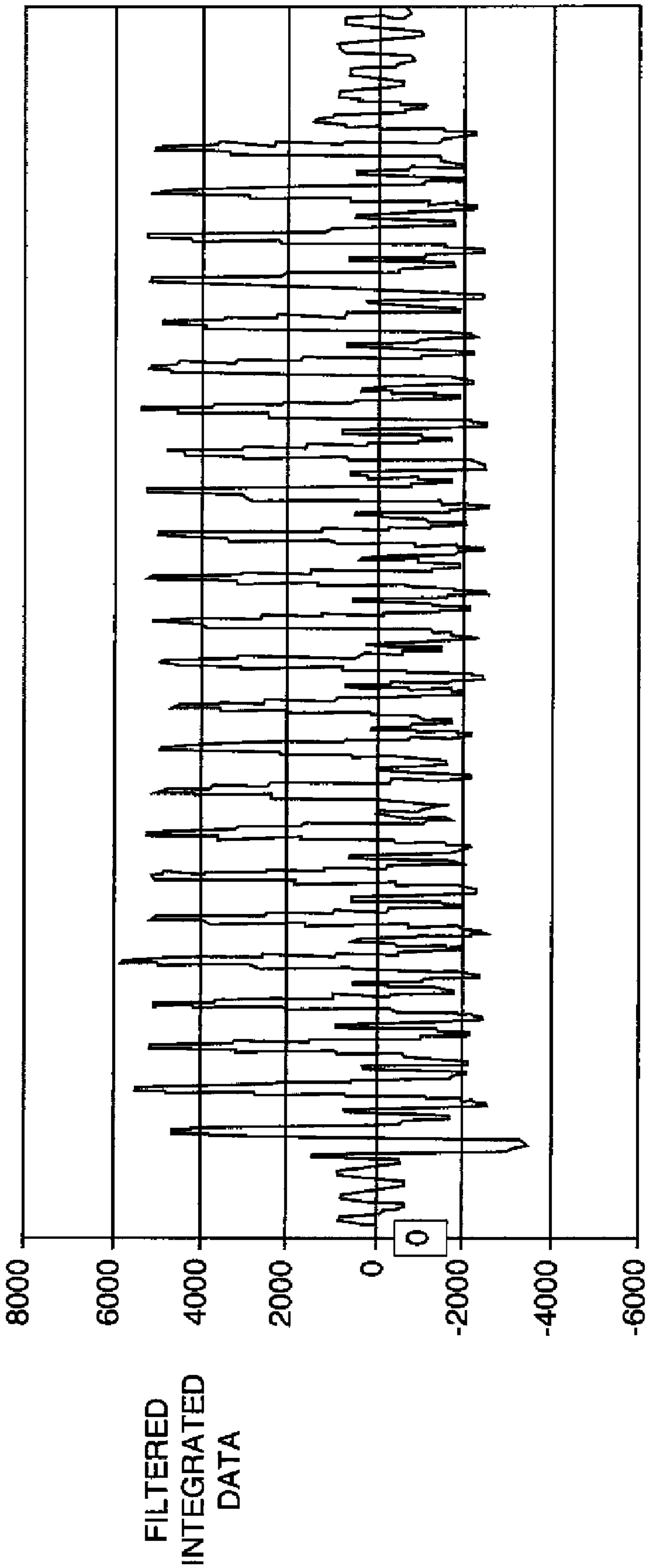
FIG. 16 is a plot of the data of FIG. 15 after processing by a high pass digital filter.

The filtering operation inverts the peaks, so that in the example of filtered integrated data shown in FIG. 16, the peaks are pointing up. Then $2^{nd}$ order polynomials are fit to the highest peaks in the filtered data, and the locations of the maxima are identified and the distance between maxima is found. As above, the results are averaged over pairs of adjacent alignment bars of type 235 and type 236.

Figure 17:
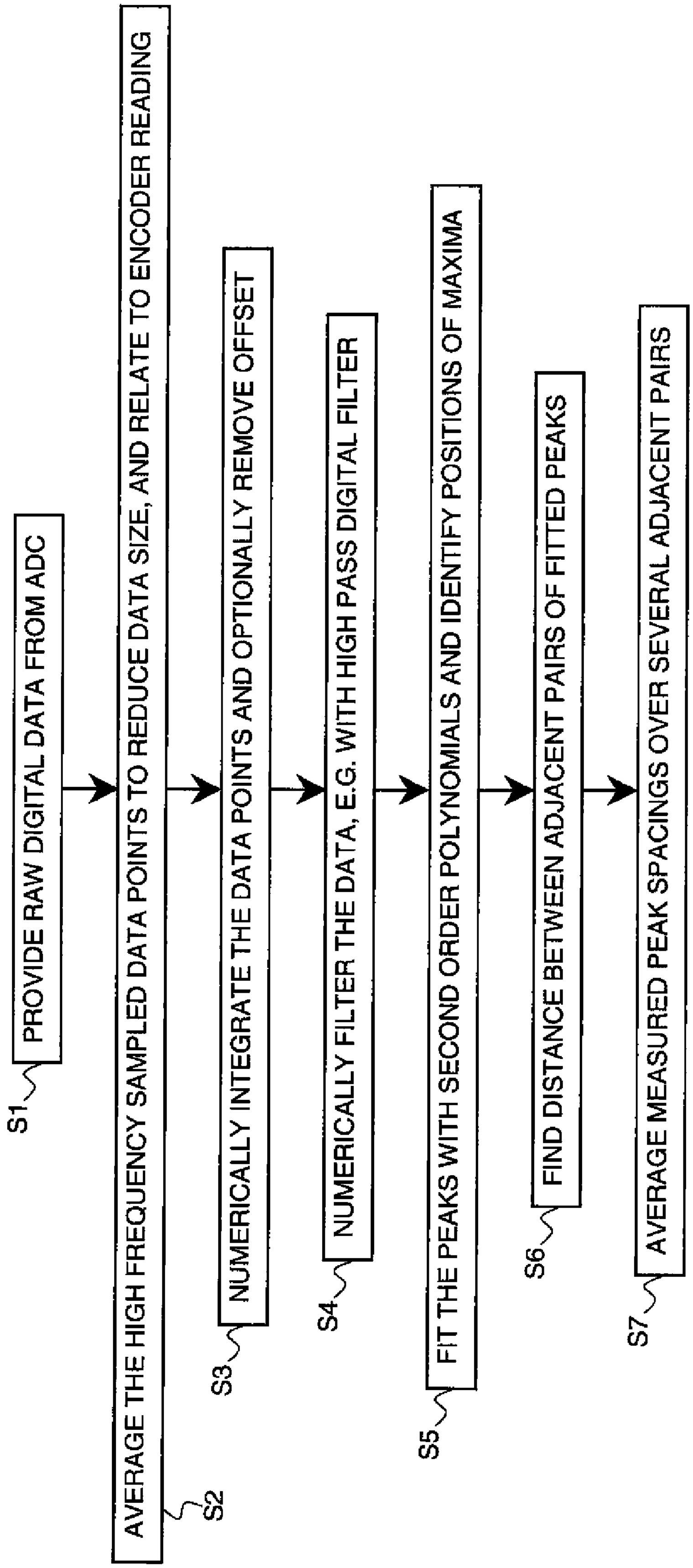
FIG. 17 is a flow diagram of a series of digital processing steps.

FIG. 17 shows a flow diagram of the digital signal processing steps described above. Step S1 (providing raw digital data from the ADC) corresponds to FIG. 13. Step S2 (averaging over a plurality of data samples from the ADC and relate to each encoder reading) corresponds to FIG. 14. Step S3 (numerically integrating the data points and removing the offset) corresponds to FIG. 15. Step S4 (numerically filtering the data, e.g. with a high pass digital filter such as a $3^{rd}$ order Butterworth filter) corresponds to FIG. 16. The remaining three steps do not have associated figures, but were discussed above. They include Step S5 (fitting the peaks with second order polynomials), Step S6 (finding the distance between adjacent pairs) and Step S7 (averaging the measured peak spacings over a plurality of adjacent pairs of peaks). It is found that in some applications employing each of Steps S1 through Step S7 provides the most accurate and repeatable distances between alignment bars. However, in other applications, it can be sufficient to employ only a subset of Steps S1 through S7, thereby saving data processing time. For example, it can be sufficient to use Step S1, S5, S6 and S7; or S1, S2, S5, S6 and S7; or S1, S2, S3, S5, S6 and S7; or S1, S2, S4, S5, S6 and S7.

Processing Digitized Signals for Bad Jet Detection

Correct identification of malfunctioning marking elements (or bad jets in the case of an inkjet printer) is important. Typically, compensation for bad jets is provided in the printer to disable the bad jet and share its workload among other jets that can access the same pixel locations in different passes of multipass printing. If a bad jet is incorrectly identified (for example, jet 101 is actually bad but its neighboring jet 102 is incorrectly identified as the bad jet) then there will be no compensation for bad jet 101 and corresponding white lines can be observed in the resulting printed images. Moreover, in this example, the printer controller will disable good jet 102. Therefore, it is important to correctly interpret the photosensor signal when analyzing a pattern such as FIG. 9, so that good jets and bad jets are correctly identified in spite of background noise.

The photosensor signal for bad jet detection is processed by circuit 350 and provided to the ADC as described above in the section on analog circuitry for carriage sensor signal, but different trade-offs can be made in processing the digitized data than as described for alignment patterns. First of all, for alignment patterns there can be on the order of several hundred alignment bars 235, 236 to accomplish all of the alignments required at sufficient accuracy. For bad jet detection there can be several thousand line segments 241, 242 that must each be examined. For alignment patterns, an accurate distance between adjacent bars must be measured, while for bad jet detection it must merely be determined whether the peak is present or not at or near its expected location. Thus, it can be appropriate to perform less digital processing on the data for bad jet detection in order to speed up the analysis.

Figure 18:
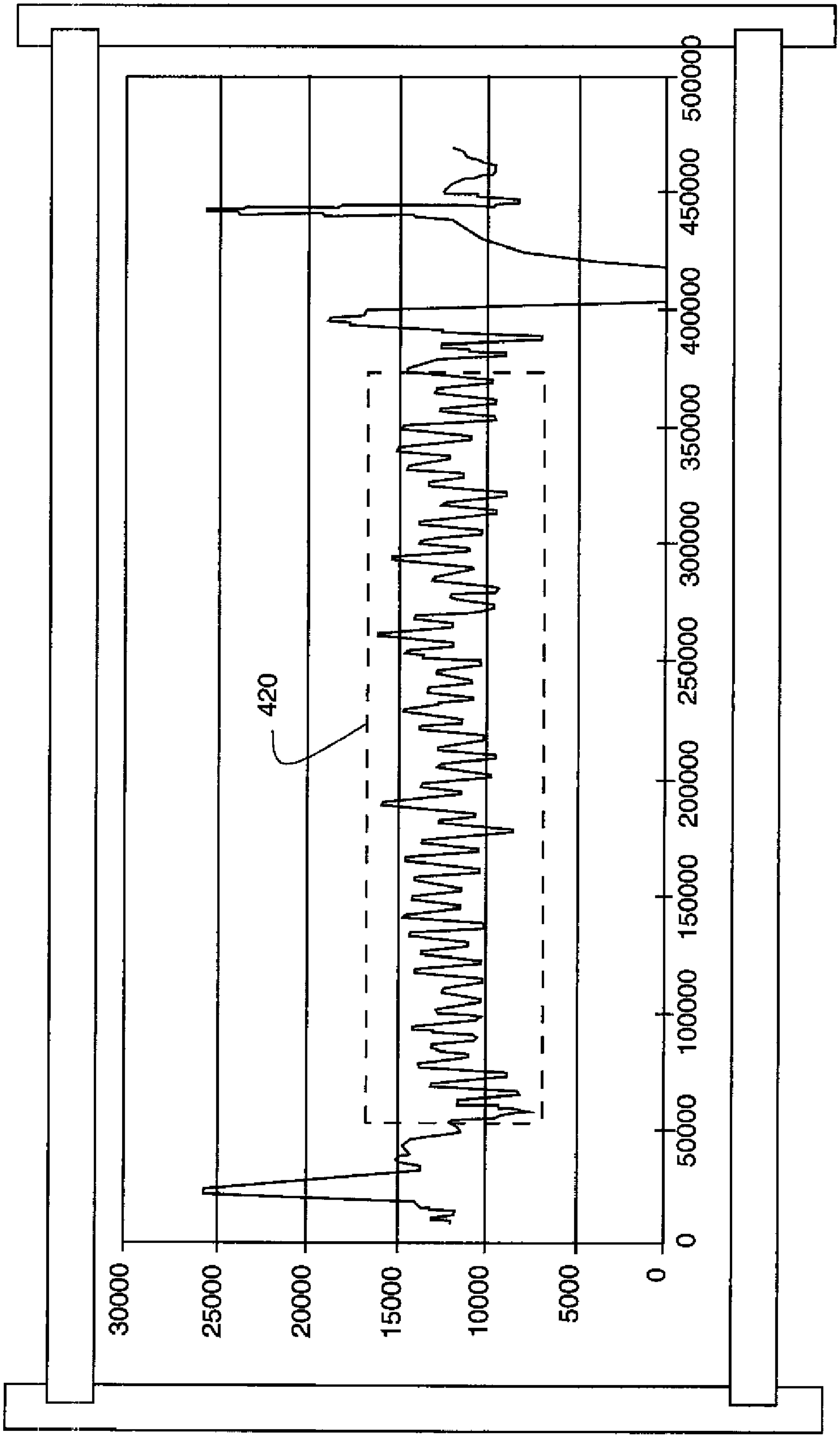
FIG. 18 is a plot of a signal for a diagnostic pattern for malfunctioning marking elements, following amplification and averaging over a plurality of data samples.
Figure 19:
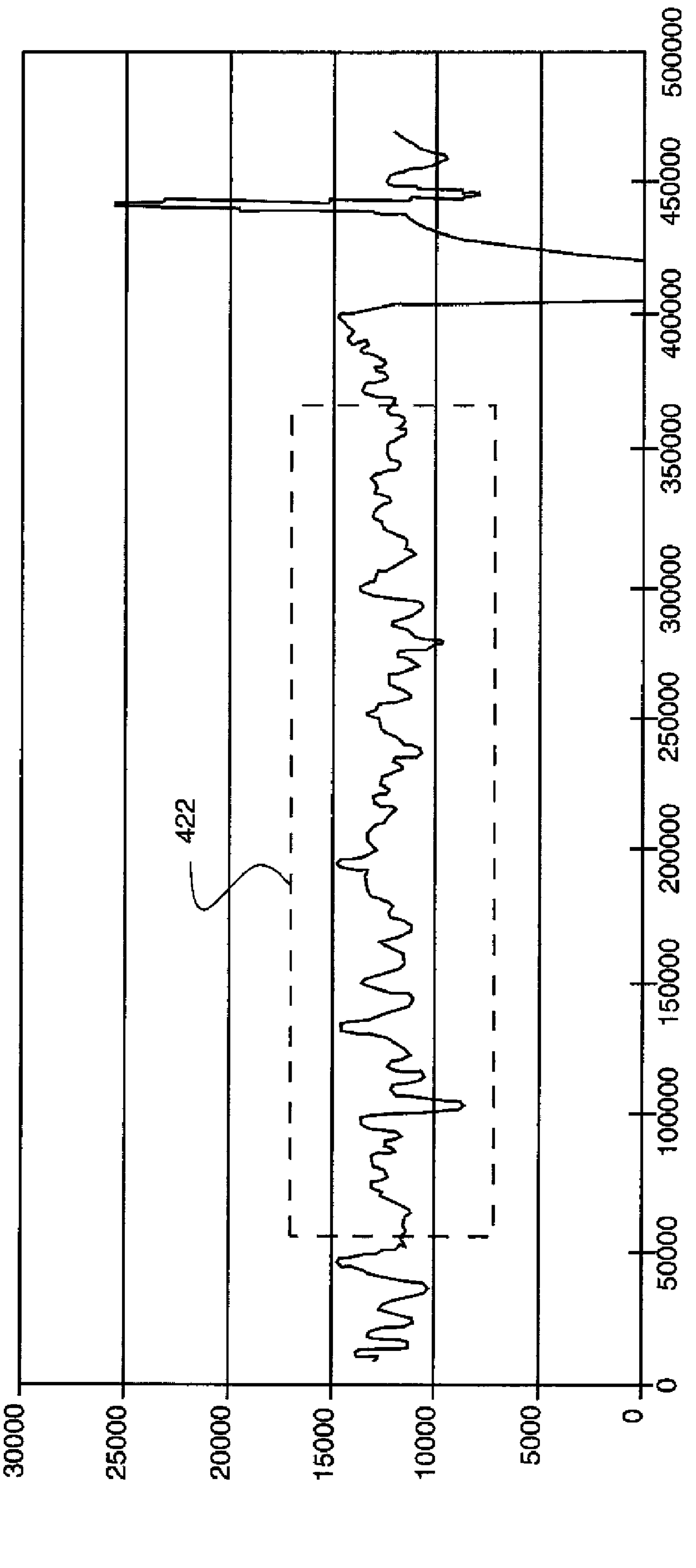
FIG. 19 is an exemplary plot of background noise from unmarked paper.

FIG. 18 shows a typical signal for bad jet detection after circuit 350 and after averaging over a plurality of data samples from the ADC and relating to each encoder reading, as in Step S2 described above. Dashed box 420 indicates the signal region of interest corresponding to photosensor field of view 225 successively moving past forty line segments 241, 242 etc. in a row 245. The signal region to the left of dashed box 420 can correspond to larger marked regions (not shown in FIG. 9) to "warm up" the jets, while the signal region to the right of dashed box 420 can correspond to the edge of the paper. Although forty distinct "peaks" (actually valleys in the view of FIG. 18) can be seen, corresponding to the forty line segments, the peaks are irregular enough that errors could be easily made in deciding whether a peak was actually present or not (i.e. whether the corresponding jet was malfunctioning or not). A large portion of this irregularity is due to background noise from paper shape. An example of background noise from unmarked paper is shown in FIG. 19. Dashed box 422 shows a region similar in size and location to that of dashed box 420 in FIG. 18. As can be seen in FIG. 19, the magnitude of the background noise is about the same size as the signal shown in FIG. 18.

It is found that numerical integration (as in Step S3) is not required in this application, but high pass digital filtering (as in Step S4) is useful for removing the low frequency paper background noise. Furthermore, in some embodiments, a second order Butterworth filter is sufficient. The second order Butterworth filter does not represent the ideal high pass filter behavior (complete attenuation of the signal below the cutoff frequency, and no attenuation of the signal above the cutoff frequency) as well as the third order Butterworth filter, but it requires fewer calculations so that it is about 30% faster.

It is found that the resulting signal has a sufficiently high signal to noise ratio that polynomial fitting (as in step S5 described for the analysis of alignment bar peaks) is not required. Instead a faster and simpler method can be sufficient for peak detection, for example using a binary search for the peak (e.g. a peak height exceeding a value) within a small range of expected locations.

Figure 20:
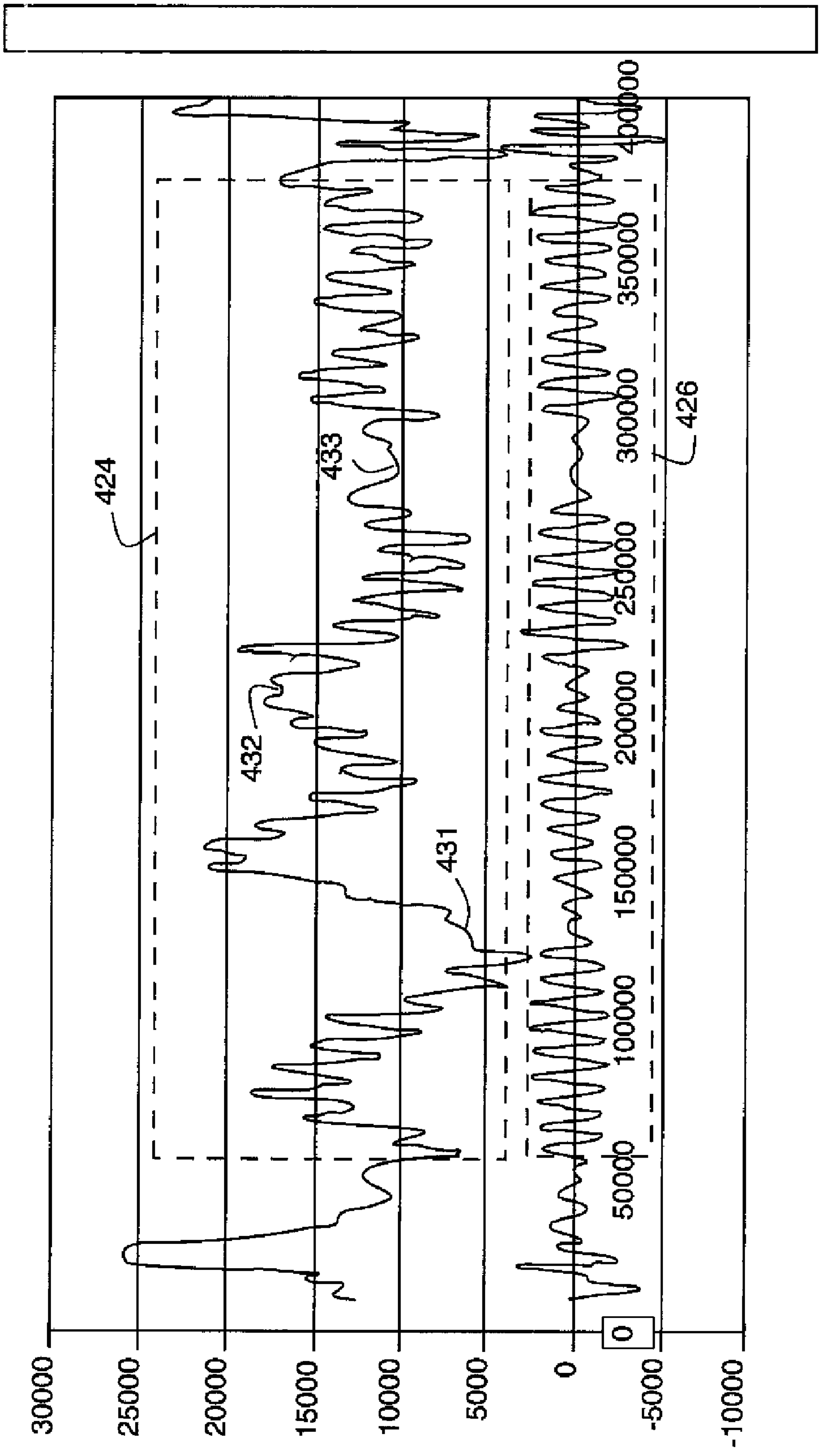
FIG. 20 is a comparison plot of signals for malfunctioning marking elements after amplification and averaging as in FIG. 18, and further after high pass digital filtering.

FIG. 20 compares the data for an example of 40 line segment locations, where in three regions nozzles have been deliberately not printed. In region 431, a single line segment was not printed. In region 432, two adjacent line segments were not printed. In region 433, three adjacent line segments were not printed. Data curve within dashed box 424 represents the signal corresponding to averaging over a plurality of data samples from the ADC and relating to each encoder reading (Step S2 of FIG. 17). Data curve within dashed box 426 represents the signal within dashed box 424 but further filtered through a high pass digital filter (step S4 of FIG. 17). It is found that missing line segment patterns could be correctly identified in processed signal corresponding to dashed box 426 but not in the signal corresponding to dashed box 424.

Processing Digitized Signals for Media Type Detection

As described above in the section on carriage sensor assembly, detection of generic media type can be accomplished using specular reflections of light emitted from LED 218. These reflections result in a signal in photosensor 212 that is amplified in circuit 350, similar to the case of diffuse reflections from LED 216 for marked regions of the paper. In the case of media detection, however, rather than trying to eliminate the "background" signal from the media reflections, the goal is to use the characteristics of the media signal to distinguish among various generic types.

Figure 21:
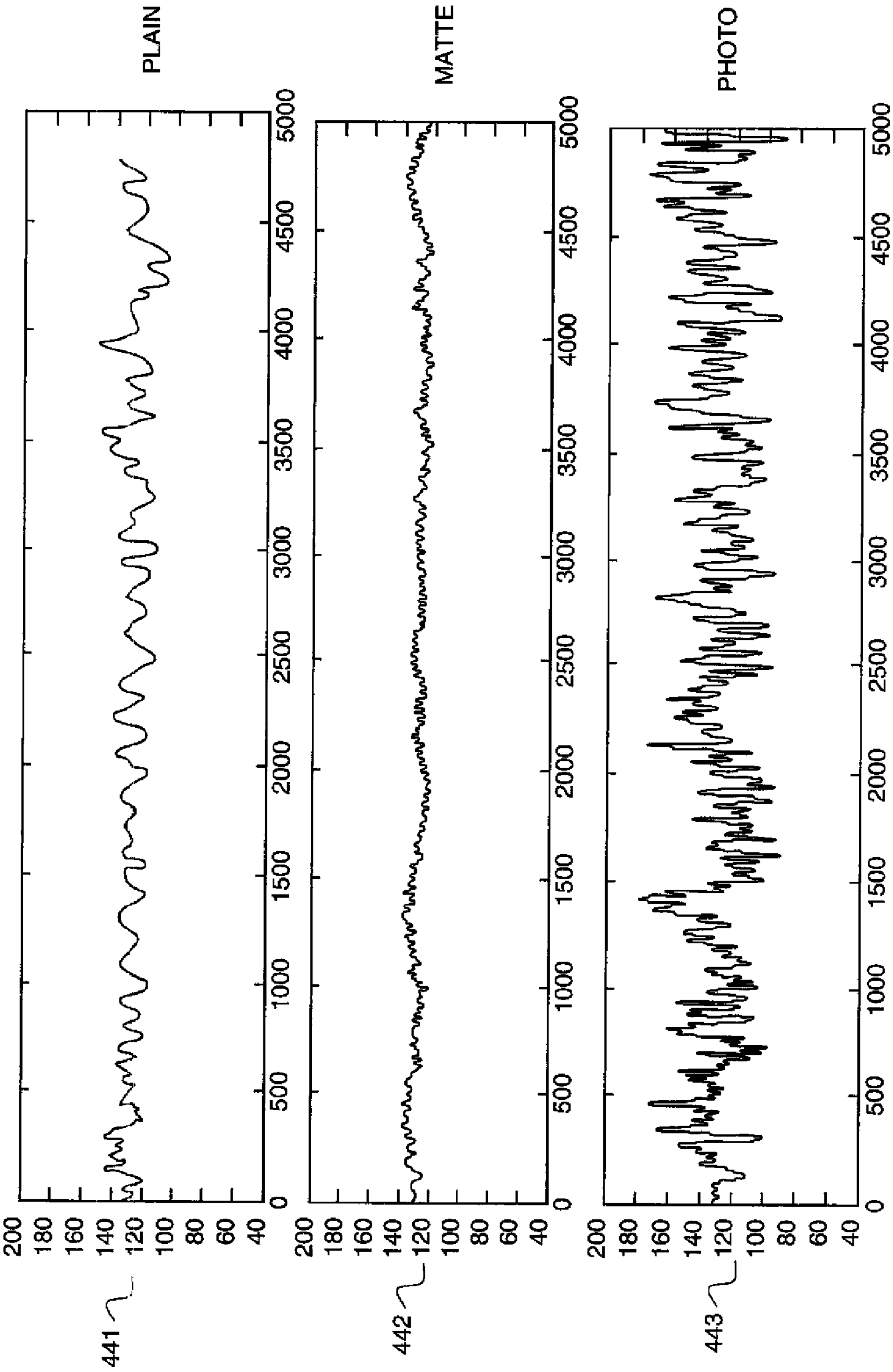
FIG. 21 shows examples of digitized data from an amplified photosensor signal corresponding to plain paper, matte paper, and glossy photo paper.

FIG. 21 shows an example of data from the ADC for representative samples of plain paper (plot 441), matte paper (plot 442) and glossy photo paper (plot 443). Note that for each plot, the data is centered around mid range of the 8 bit ADC (level 128) as described above. As is readily apparent from FIG. 21, the signal 441 from plain paper has relatively high amplitude of low frequency variations, but relatively low amplitude of high frequency variations. Signal 442 from matte paper has relatively low amplitude of both low frequency and high frequency variations. Signal 443 from glossy photo paper is dominated by high amplitude high frequency variations. Many different specific papers classified into these generic paper types were measured and were found to have similar trends relative to amplitudes of high frequency and low frequency variations in the signal.

What is needed is a way of characterizing the amplitudes of the low frequency and high frequency components of signal variations of the specular reflections from the media. The digitized data from the ADC is typically stored in memory. Optionally, the sampled ADC signal from specular reflections from the media can first be averaged over a plurality of data samples from the ADC and related to each encoder reading, corresponding to Step S2 in FIG. 17. This gives a signal P(n) where n is the nth encoder signal. The signal processing for low frequency and high frequency variations must be done rapidly so that a quick determination of generic media type can be made if no bar code is present on the reverse side of the media, or unacceptable delays in printing can result.

A quick and simple method of separating out the high frequency and low frequency components of the signal is as follows: 1) Perform a moving average over M (e.g. M=15 in this example, but more generally M>10 and M<10,000) successive data points P(n) of a first data set to provide a measurement $<P(n)>_M$ of the low frequency component of the variation. 2) Then subtract values of the moving average from the corresponding values of the first data set to provide a measurement of the high frequency component of the variation. In other words, in this example, $$\text{Low frequency data set} = <P(n)>_M$$

$$\text{High frequency data set} = P(n) - <P(n)>_M.$$

If sufficiently fast electronics is available, other ways of separating out the low frequency component and the high frequency component are the use of fast Fourier transforms, or the use of high pass, low pass or notch filters.

Figure 22:
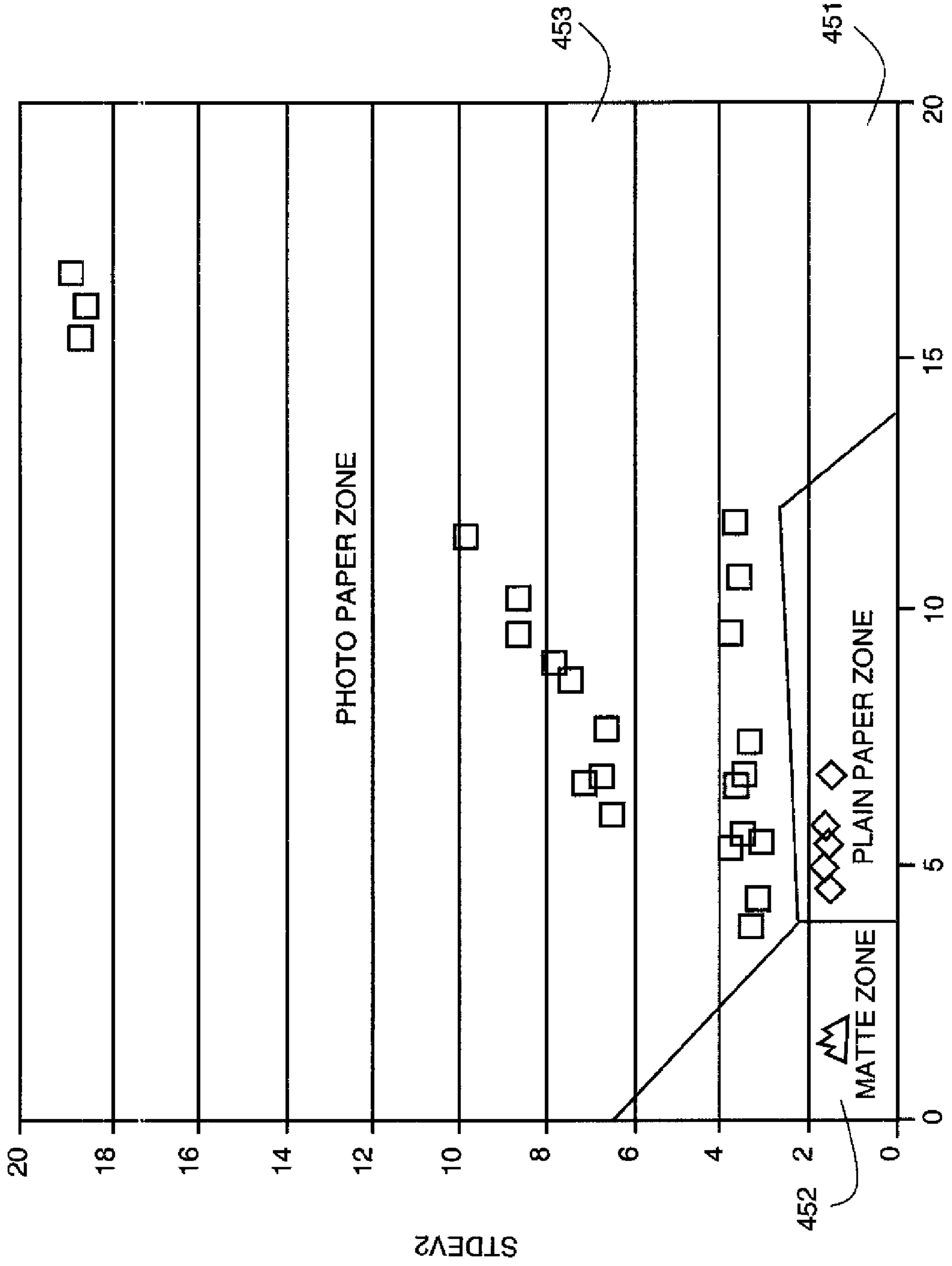
FIG. 22 is a plot showing the correspondence of paper type to the relationship between the standard deviation of low frequency data and the standard deviation of high frequency data from the photosensor signal.

The relative amplitudes of variation of the low frequency data set and the high frequency data set can then be found by standard deviations. Let STDEV1 represent the standard deviation of the low frequency data set and STDEV2 represent the standard deviation of the high frequency data set. A variety of media from different suppliers was characterized in this way over a number of different printer units and the result is shown in FIG. 22. As can be seen in FIG. 22, it is possible to divide the plot into 3 zones. Plain paper zone 451 has relatively low standard deviation for the high frequency component, but relatively high standard deviation for the low frequency component (especially as compared to matte paper zone 452). Photo paper zone 453 has relatively high standard deviation for the high frequency component, as well as relatively high standard deviation for the low frequency component, compared to matte paper zone 452. Note that in the example of FIG. 22, the zone boundaries have not all been specified strictly on the basis of a particular value of STDEV1 or STDEV2, but sometimes as mixed functions of STDEV1 and STDEV2. In a more simplified setting of zone boundaries, one can characterize matte paper zone 452 as having STDEV1<A and STDEV2<B; plain paper zone 451 as having STDEV1>A and STDEV2<B; and photo paper zone 453 as having STDEV2>B, where A~3 and B~2.5 in the units of FIG. 22. However, in the zone boundary setting shown in FIG. 22, the zone boundary for matte paper zone 452 is STDEV1<A, and STDEV2<($C_1$ STDEV1+$C_2$) for STDEV1<A, where A~3, $C_1$~−1.3 and $C_2$~6.4 in the units of FIG. 22. Furthermore in FIG. 22 (ignoring the slight upward slope of the STDEV2 boundary between plain paper and photo paper zones) the zone boundary for plain paper zone 451 is approximately described by A<STDEV1<($C_3$+$C_4$ STDEV2), and STDEV2<$C_5$. Photo paper zone 453 is everywhere else that is not in zones 451 and 452. This method has been shown to be about 99.5% reliable in distinguishing different generic types of media. A table indicating the correspondence between generic media types and the relationship of standard deviations of the low pass data set and the high pass data set is stored in the printing system and used to identify the recording media type that is scanned by the carriage sensor assembly 210.

The invention has been described in detail with particular reference to certain preferred embodiments thereof, but it will be understood that variations and modifications can be effected within the scope of the invention.

PARTS LIST

10 Inkjet printer system
12 Image data source
14 Controller
16 Electrical pulse source
18 First fluid source
19 Second fluid source
20 Recording medium
100 Ink jet printhead
110 Ink jet printhead die
111 Substrate
120 First nozzle array
121 Nozzle in first nozzle array
122 Ink delivery pathway for first nozzle array
130 Second nozzle array
131 Nozzle in second nozzle array
132 Ink delivery pathway for second nozzle array
181 Droplet ejected from first nozzle array
182 Droplet ejected from second nozzle array
200 Carriage
210 Carriage sensor assembly
211 Frame of carriage sensor assembly
212 Photosensor
213 Bolt
214 Aperture
215 Photosensor lens
216 LED mounted for diffuse reflections
217 LED lens
218 LED mounted for specular reflections
219 LED lens

220 Wiring board
221 Photosensor electrical leads
222 LED electrical leads
223 LED electrical leads
225 Field of view of photosensor through aperture
230 Alignment pattern
231 Row of alignment bars
232 Row of alignment bars
233 Row of alignment bars
234 Row of alignment bars
235 First type alignment bar
236 Second type alignment bar
240 Bad jet detection pattern
241 Line segment printed by a first jet
242 Line segment printed by a second jet
245 Row of line segments
246 Row of line segments
250 Printhead chassis
251 Printhead die
253 Nozzle array
254 Nozzle array direction
256 Encapsulant
257 Flex circuit
258 Connector board
262 Multichamber ink supply
264 Single chamber ink supply
300 Printer chassis
302 Paper load entry
303 Print region or platen
304 Paper exit
306 Right side of printer chassis
307 Left side of printer chassis
308 Front of printer chassis
309 Rear of printer chassis
310 Hole for paper advance motor drive gear
311 Feed roller gear
312 Feed roller
313 Forward rotation of feed roller
319 Feed roller shaft
320 Pickup roller
322 Turn roller
323 Idler roller
324 Discharge roller
325 Star wheel
330 Maintenance station
342 Photosensor signal
344 Current-to-voltage converting resistor
350 Amplifier circuit
351 High frequency limiting capacitor
352 Time derivative section of amplifier circuit
353 Operational amplifier
354 Output of section 352 of amplifier circuit
355 AC coupling capacitor
356 Feedback resistor
357 Stabilizing resistor
358 Biasing section of amplifier circuit
359 Voltage divider
360 Capacitor
361 High frequency limiting capacitor
362 Second stage amplifier section
363 Operational amplifier
364 Amplifier output to analog to digital converter
365 Feedback resistor
366 Input resistor
367 Corner frequency of amplifier gain
368 Frequency range of interest for detection of marks
370 Stack of media
371 Top sheet
372 Main paper tray
373 Photo paper stack
374 Photo paper tray
375 Backside media sensor
380 Carriage motor
382 Carriage rail
384 Belt
390 Printer electronics board
392 Cable connectors
410 Background signal before alignment bars
412 Background signal after alignment bars
420 Signal region for bad jet detection pattern
422 Background noise
424 Signal region without high pass filtering
426 Signal region with high pass filtering
431 Region with one missing line segment
432 Region with two adjacent missing line segments
433 Region with three adjacent missing line segments
441 Signal corresponding to plain paper
442 Signal corresponding to matte paper
443 Signal corresponding to glossy photo paper
451 Plain paper zone of standard deviation plot
452 Matte paper zone of standard deviation plot
451 Photo paper zone of standard deviation plot

The invention claimed is:

1. A method for identifying a type of recording medium using a time-varying output signal from a photosensor, the time-varying output signal being obtained by sensing an output of the photosensor as a function of time while the recording medium is being moved with respect to the photosensor, the method comprising:

amplifying the time-varying output signal of the photosensor;

converting the amplified time-varying output signal of the photosensor to digitized data points using an analog to digital converter thereby creating a first set of digitized data;

applying a digital filtering operation to the first set of digitized data to provide a low pass data set that includes low temporal frequencies;

applying a digital filtering operation to the first set of digitized data to provide a high pass data set that includes high temporal frequencies, the high temporal frequencies being higher than the low temporal frequencies;

computing the standard deviation of the low pass data set;

computing the standard deviation of the high pass data set; and identifying the recording medium type using values from both the standard deviation of the low pass data set and the standard deviation of the high pass data set.

2. The method of claim 1, wherein the time-varying output signal is created by specularly reflecting light from the surface of the recording medium.

3. The method of claim 1, wherein applying the digital filtering operation to the first set of digitized data to provide the low pass data set includes computing a moving average of M successive digitized data points.

4. The method of claim 3, wherein $M>10$ and $M<10,000$.

5. The method of claim 1, wherein applying the digital filtering operation to the first set of digitized data to provide the high pass data set includes subtracting values of the low pass data set from corresponding values of the first set of digitized data.

6. The method of claim 1, wherein identifying the recording medium type further comprises:

developing a table indicating a correspondence between recording media types and the relationship of the standard deviations of the low pass data set and the high pass data set;

storing the table; and using the table to identify the type of recording medium.

7. The method of claim 6, wherein a matte paper recording medium is identified as corresponding to a standard deviation of the low pass data set that is less than a first value, and a standard deviation of the high pass data set that is less than a first parameter.

8. The method of claim 7, wherein the first parameter is dependent upon the standard deviation of the low pass data set.

9. The method of claim 7, wherein a plain paper recording medium is identified as corresponding to a standard deviation of the low pass data set that is greater than the first value and less than a second parameter, and a standard deviation of the high pass data set that is less than a second value.

10. The method of claim 9, wherein second parameter is dependent upon the standard deviation of the high pass data set.

11. The method of claim 9, wherein a glossy paper recording medium is identified as corresponding to standard deviations of the low pass data set and the high pass data set that are outside the ranges provided for the matte paper recording medium and the plain paper recording medium.

* * * * *